(12) United States Patent
Dabeer et al.

(10) Patent No.: US 10,630,962 B2
(45) Date of Patent: Apr. 21, 2020

(54) SYSTEMS AND METHODS FOR OBJECT LOCATION

(71) Applicant: QUALCOMM Incorporated, San Diego, CA (US)

(72) Inventors: Onkar Jayant Dabeer, San Diego, CA (US); Gerhard Reitmayr, Vienna (AT); Ravi Teja Sukhavasi, San Diego, CA (US); Kiran Somasundaram, San Diego, CA (US); Radhika Dilip Gowaikar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 15/621,716

(22) Filed: Jun. 13, 2017

(65) Prior Publication Data
US 2018/0192035 A1 Jul. 5, 2018

Related U.S. Application Data

(60) Provisional application No. 62/442,399, filed on Jan. 4, 2017.

(51) Int. Cl.
*G06K 9/00* (2006.01)
*H04N 13/264* (2018.01)
(Continued)

(52) U.S. Cl.
CPC ............ *H04N 13/264* (2018.05); *G06F 16/86* (2019.01); *G06K 9/00798* (2013.01);
(Continued)

(58) Field of Classification Search
CPC .............. G06T 3/4007; G06K 9/00798; G06K 9/00818; G06F 16/86; H04N 5/2329; H04N 7/18; H04N 7/181; H04N 13/264
See application file for complete search history.

(56) References Cited

U.S. PATENT DOCUMENTS 6,985,620 B2 * 1/2006 Sawhney ................ G01S 5/163
345/419
8,761,439 B1 6/2014 Kumar et al.
(Continued)

OTHER PUBLICATIONS

Liang C-K, et al., "Analysis and Compensation of Rolling Shutter Effect", IEEE Transactions on Image Processing, 2008, pp. 1-8.
(Continued)

*Primary Examiner* — Gregory M Desire
(74) *Attorney, Agent, or Firm* — QUALCOMM Incorporated

(57) ABSTRACT

A method performed by an apparatus is described. The method includes receiving a set of image frames including at least one object. The method also includes receiving a camera position for each image frame. The method further includes associating the at least one object between image frames based on one or more object points and the received camera position for each image frame to produce two-dimensional (2D) object location data. The method additionally includes estimating three-dimensional (3D) pose data of the at least one object based on the 2D object location data. The method also includes refining the 3D pose data based on a shape constraint.

30 Claims, 11 Drawing Sheets

(51) Int. Cl.
*G06T 3/40* (2006.01)
*G06F 16/84* (2019.01)
*H04N 7/18* (2006.01)
*H04N 5/232* (2006.01)
*G06T 7/73* (2017.01)
*G06T 5/00* (2006.01)
*G06T 5/50* (2006.01)

(52) U.S. Cl.
CPC ........ *G06K 9/00818* (2013.01); *G06T 3/4007* (2013.01); *G06T 5/002* (2013.01); *G06T 5/50* (2013.01); *G06T 7/73* (2017.01); *H04N 5/2329* (2013.01); *H04N 7/18* (2013.01); *H04N 7/181* (2013.01); *G06T 2207/10016* (2013.01); *G06T 2207/20201* (2013.01)

(56) References Cited

U.S. PATENT DOCUMENTS

| | | | | |
|---|---|---|---|---|
| 9,386,209 | B2* | 7/2016 | Kim | G06K 9/00798 |
| 9,415,310 | B2* | 8/2016 | Martini | G06T 7/0008 |
| 9,699,375 | B2* | 7/2017 | Fan | H04N 5/23229 |
| 9,749,594 | B2* | 8/2017 | Huang | H04N 7/181 |
| 10,204,448 | B2* | 2/2019 | Hazeghi | H04N 13/243 |
| 2003/0219146 | A1* | 11/2003 | Jepson | G06K 9/32 382/103 |
| 2004/0105573 | A1* | 6/2004 | Neumann | G06T 17/00 382/103 |
| 2007/0253618 | A1* | 11/2007 | Kim | G06T 7/80 382/154 |
| 2013/0044230 | A1 | 2/2013 | Zhou | |
| 2016/0305784 | A1 | 10/2016 | Roumeliotis et al. | |
| 2017/0046580 | A1 | 2/2017 | Lu et al. | |
| 2018/0176483 | A1* | 6/2018 | Knorr | G06T 19/006 |
| 2018/0192035 | A1* | 7/2018 | Dabeer | G06T 3/4007 |

OTHER PUBLICATIONS

Dabeer O., et al., "An End-to-End System for Crowdsourced 3d Maps for Autonomous Vehicles: The Mapping Component," Computer Science—Robotics, Mar. 2017, pp. 1-8.

* cited by examiner

SYSTEMS AND METHODS FOR OBJECT LOCATION

RELATED APPLICATION

This application is related to and claims priority to U.S. Provisional Patent Application Ser. No. 62/442,399, filed Jan. 4, 2017, for "SYSTEMS AND METHODS FOR MAPPING AN OBJECT."

FIELD OF DISCLOSURE

The present disclosure relates generally to electronic devices. More specifically, the present disclosure relates to systems and methods for object location.

BACKGROUND

Some electronic devices (e.g., cameras, video camcorders, digital cameras, cellular phones, smart phones, computers, televisions, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, drones, smart applications, healthcare equipment, set-top boxes, etc.) capture and/or utilize images. For example, a smartphone may capture and/or process still and/or video images. The images may be processed, displayed, stored and/or transmitted. The images may portray a scene including a landscape and/or objects, for example.

In some cases, it may be difficult to locate objects. For example, it may be difficult to determine an object position based on images. As can be observed from this discussion, systems and methods that improve determining object position may be beneficial.

SUMMARY

A method performed by an apparatus is described. The method includes receiving a set of image frames including at least one object. The method also includes receiving a camera position for each image frame. The method further includes associating the at least one object between image frames based on one or more object points and the received camera position for each image frame to produce two-dimensional (2D) object location data. The method additionally includes estimating three-dimensional (3D) pose data of the at least one object based on the 2D object location data. The method also includes refining the 3D pose data based on a shape constraint. The method may include uploading refined 3D pose data to a mapping database.

The method may include interpolating camera pose variables for one or more points of the at least one object. Interpolating camera pose variables may be based on a pixel location of the at least one object in the set of image frames. Interpolating camera pose variables may be based on a timing of a pixel capture of the at least one object in the set of image frames. The interpolation may be performed for at least a road sign or a lane marker. Associating the at least one object, estimating the 3D pose data, and/or refining the 3D pose data may be based on interpolated camera pose variables.

Refining the 3D pose data may include reducing a first reprojection error for an individual sign corner. Refining the 3D pose data may also include reparametrizing 3D sign pose data. Refining the 3D pose data may further include reducing a second reprojection error for reparametrized 3D sign pose data. Refining the 3D pose data may include reducing a reprojection error for spline parameters.

Estimating the 3D pose data may include estimating a road normal vector. Estimating the road normal vector may be performed online based on an offline estimated road normal vector.

An apparatus is also described. The apparatus includes a memory. The apparatus also includes a processor coupled to the memory. The processor is configured to receive a set of image frames including at least one object. The processor is also configured to receive a camera position for each image frame. The processor is further configured to associate the at least one object between image frames based on one or more object points and the received camera position for each image frame to produce two-dimensional (2D) object location data. The processor is additionally configured to estimate three-dimensional (3D) pose data of the at least one object based on the 2D object location data. The processor is also configured to refine the 3D pose data based on a shape constraint.

A non-transitory tangible computer-readable medium storing computer executable code is also described. The computer-readable medium includes code for causing an electronic device to receive a set of image frames including at least one object. The computer-readable medium also includes code for causing the electronic device to receive a camera position for each image frame. The computer-readable medium further includes code for causing the electronic device to associate the at least one object between image frames based on one or more object points and the received camera position for each image frame to produce two-dimensional (2D) object location data. The computer-readable medium additionally includes code for causing the electronic device to estimate three-dimensional (3D) pose data of the at least one object based on the 2D object location data. The computer-readable medium also includes code for causing the electronic device to refine the 3D pose data based on a shape constraint.

An apparatus is also described. The apparatus includes means for receiving a set of image frames including at least one object. The apparatus also includes means for receiving a camera position for each image frame. The apparatus further includes means for associating the at least one object between image frames based on one or more object points and the received camera position for each image frame to produce two-dimensional (2D) object location data. The apparatus additionally includes means for estimating three-dimensional (3D) pose data of the at least one object based on the 2D object location data. The apparatus also includes means for refining the 3D pose data based on a shape constraint.

DETAILED DESCRIPTION

Figure 1:
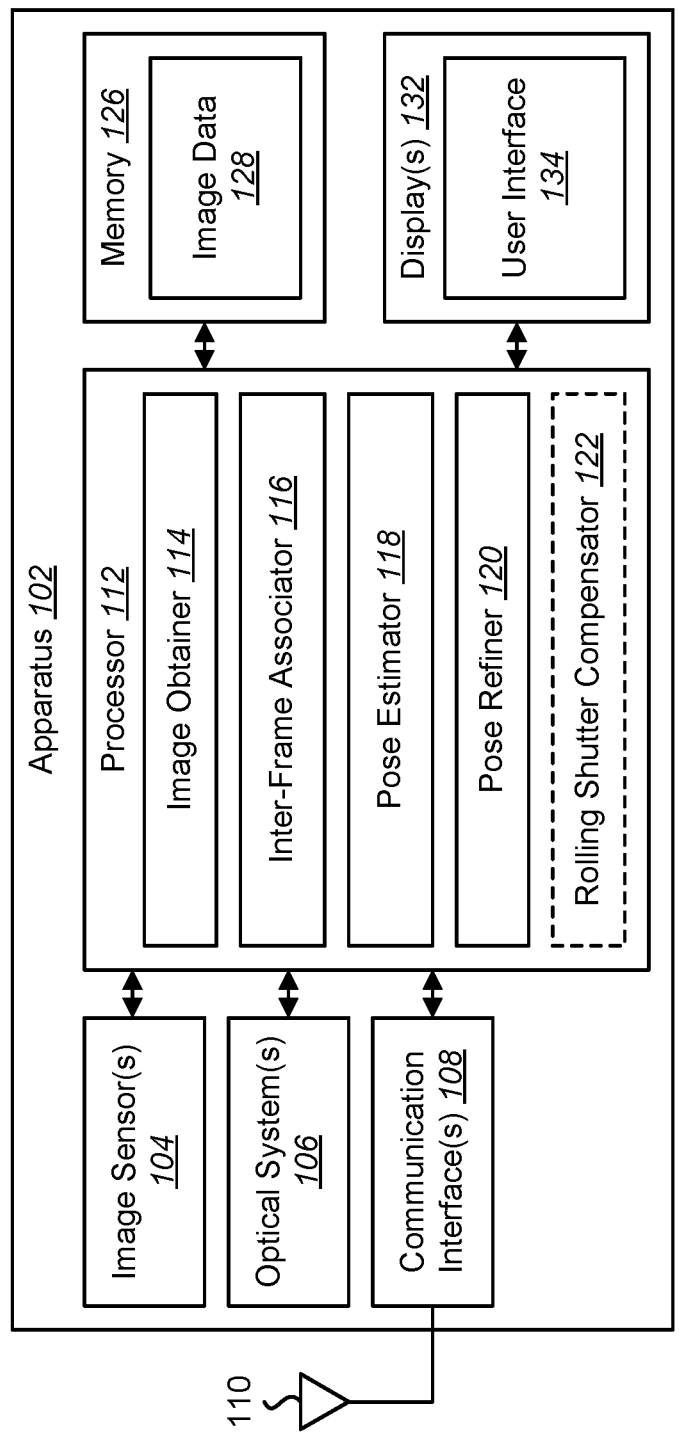
FIG. 1 is a block diagram illustrating one example of an apparatus in which systems and methods for object location may be implemented.

The systems and methods disclosed herein relate to object location. For example, some configurations of the systems and methods disclosed herein may relate to object association and 6 degrees of freedom (DOF) triangulation of landmarks for precise three-dimensional (3D) maps using rolling shutter cameras. Some apparatuses (e.g., autonomous vehicles, robots, semi-autonomous vehicles, etc.) may leverage a precise three-dimensional (3D) map of the environment, which can be used for precise localization of the apparatus as well as dissemination of local semantic information. Some configurations of the systems and methods described herein provide the process of creating 6 degrees of freedom (DOF) landmarks (e.g., traffic signs, traffic lanes, buildings, obstructions, barriers, etc.) based on two-dimensional (2D) information in camera images and position of the camera in the 3D world.

Some configurations of the systems and methods disclosed herein may perform and/or utilize one or more of the following three steps. 1) Association across camera frames: objects such as traffic signs and lanes detected in camera frames may be associated over several camera frames. Towards this end, information may be used such as the location of object pixels in the image, some object features such as corners, and/or the camera position of each pixel.

2) Triangulation: geometric techniques may be used to convert a series of 2D pixel information and 6 DOF camera poses to get an initial estimate of the 6 DOF landmarks. 3) Optimization: the landmark 6 DOF pose may be further optimized using step 2 as an initialization to obtain a better fit to the observations. The nature of optimization may depend on the type of landmark. For example: traffic signs may be parametrized by their center and orientation matrix while traffic lanes may be parametrized as 3D splines.

Some configurations of the systems and methods disclosed herein may additionally or alternatively account for several non-idealities. 1) Rolling shutter of the camera may be compensated for by interpolating and maintaining camera pose variables corresponding to several key points associated with the objects in the camera image. 2) For landmarks expected to lie on the road (e.g., traffic lane markers, turn markers, etc.), the vector normal to the road surface (e.g., "road normal") may be estimated in real time using a calibration-based road normal as initialization and by optimizing the inverse perspective map (IPM) parameters to make the road points in the IPM domain as planar as possible.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an apparatus 102 in which systems and methods for object location may be implemented. For instance, the apparatus 102 may be configured to locate one or more objects in an environment based on image data. Examples of the apparatus 102 include vehicles, autonomous vehicles, cameras, video camcorders, digital cameras, smart phones, computers (e.g., integrated computers, on-board computers, laptop computers, etc.), tablet devices, personal cameras, action cameras, surveillance cameras, mounted cameras, connected cameras, robots, aircraft, drones, unmanned aerial vehicles (UAVs), healthcare equipment, gaming consoles, personal digital assistants (PDAs), etc. For instance, the apparatus 102 may be an autonomous vehicle, a self-driving vehicle, etc., and/or may include an Advanced Driver Assistance System (ADAS). The apparatus 102 may include one or more components or elements. One or more of the components or elements may be implemented in hardware (e.g., circuitry, an application specific integrated circuit (ASIC), etc.), implemented in a combination of hardware and software (e.g., a processor with instructions), and/or may be implemented in firmware.

In some configurations, the apparatus 102 may include a processor 112, a memory 126, a display 132, one or more image sensors 104, one or more optical systems 106, and/or a communication interface 108. The processor 112 may be coupled to (e.g., in electronic communication with) the memory 126, display 132, image sensor(s) 104, optical system(s) 106, and/or communication interface 108. It should be noted that one or more of the elements illustrated in FIG. 1 may be optional. In particular, the apparatus 102 may not include one or more of the elements illustrated in FIG. 1 in some configurations. For example, the apparatus 102 may or may not include an image sensor 104 and/or optical system 106. Additionally or alternatively, the apparatus 102 may or may not include a display 132. Additionally or alternatively, the apparatus 102 may or may not include a communication interface 108.

In some configurations, the apparatus 102 may perform one or more of the functions, procedures, methods, steps, etc., described in connection with one or more of FIGS. 1-11. Additionally or alternatively, the apparatus may include one or more of the structures described in connection with one or more of FIGS. 1-11.

In some configurations, the apparatus 102 may present a user interface 134 on the display 132. For example, the user interface 134 may enable a user to interact with the apparatus 102. In some configurations, the display 132 may be a touchscreen that receives input from physical touch (by a finger, stylus, or other tool, for example). Additionally or alternatively, the apparatus 102 may include or be coupled to another input interface. For example, the apparatus 102 may include a camera facing a user and may detect user gestures (e.g., hand gestures, arm gestures, eye tracking, eyelid blink, etc.). In another example, the apparatus 102 may be coupled to a mouse and may detect a mouse click. In some configurations, one or more of the images described herein may be presented on the display 132 and/or user interface 134. In some configurations, the user interface 134 may enable a user to indicate preferences (e.g., view settings) and/or interact with the view.

The communication interface 108 may enable the apparatus 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface). In some configurations, the communication interface 108 may send information (e.g., image information, pose information, location information, object detection information, mapping information, etc.) to and/or receive information from another apparatus or device (e.g., a vehicle, a smart phone, a camera, a display, a remote server, etc.).

The apparatus 102 (e.g., image obtainer 114) may obtain one or more images (e.g., digital images, image frames, frames, video, etc.). The one or more images (e.g., frames) may be images of a scene (e.g., one or more objects and/or background). In some cases, the image(s) may include objects (e.g., landmarks, road signs, lane markers, etc.). In some configurations, the apparatus 102 may include one or more image sensors 104 and one or more optical systems 106 (e.g., lenses). An optical system 106 may focus images of objects that are located within the field of view of the optical system 106 onto an image sensor 104. The optical system(s) 106 may be coupled to and/or controlled by the processor 112 in some configurations.

A camera may include at least one image sensor and at least one optical system. Accordingly, the apparatus 102 may be one or more cameras and/or may include one or more cameras in some implementations. In some configurations, the image sensor(s) 104 may capture the one or more images (e.g., image frames, video, still images, burst mode images, stereoscopic images, etc.). In some configurations, the image sensor(s) 104 may capture the one or more images. In some implementations, the apparatus 102 may include a single image sensor 104 and/or a single optical system 106. For example, a single camera with a particular resolution (e.g., video graphics array (VGA) resolution, 1280×800 pixels, etc.), at a particular frame rate (e.g., 30 frames per second (fps), 60 fps, 120 fps, etc.) may be utilized. In other implementations, the apparatus 102 may include multiple optical system(s) 106 and/or multiple image sensors 104. For example, the apparatus 102 may include two or more lenses in some configurations. The lenses may have the same focal length or different focal lengths.

Additionally or alternatively, the apparatus 102 may request and/or receive the one or more images from another device (e.g., one or more external image sensors coupled to the apparatus 102, a network server, drop camera, vehicle camera(s), etc.). In some configurations, the apparatus 102 may request and/or receive the one or more images via the communication interface 108. For example, the apparatus 102 may or may not include a camera (e.g., an image sensor 104 and/or optical system 106) and may receive images from one or more remote devices.

In some examples, the image sensor(s) 104 and/or the optical system(s) 106 may be mechanically coupled to the apparatus 102 (e.g., may be attached to, mounted on, and/or integrated into the hood of a car, a rear-view mirror mount, a side-view mirror, a bumper, etc.). The image sensor(s) 104 and/or optical system(s) 106 may be linked to the apparatus 102 via wired and/or wireless link. For example, the image sensor(s) 104 and/or optical system(s) 106 may be hardwired to a control mechanism (e.g., processor 112) in a vehicle or information captured by the image sensor(s) and/or optical system(s) may be wirelessly transmitted (e.g., streamed or otherwise wirelessly transported) to the control mechanism (e.g., processor 112).

The memory 126 may store instructions and/or data. The processor 112 may access (e.g., read from and/or write to) the memory 126. Examples of instructions and/or data that may be stored by the memory 126 may include image data 128, object detection data, object location data, 2D object location data (e.g., pixel data), object points, feature points, key points, corners, object mapping data, 3D object location data, camera pose information, road normal vector data, image obtainer 114 instructions, inter-frame associator 116 instructions, pose estimator 118 instructions, pose refiner 120 instructions, rolling shutter compensator 122 instructions, and/or instructions for other elements, etc.

In some configurations, the apparatus 102 (e.g., the memory 126) may include an image data buffer (not shown). The image data buffer may buffer (e.g., store) image data (e.g., image frame(s)) from the image sensor(s) 104. The buffered image data may be provided to the processor 112. For example, the memory 126 may store one or more frames from a video feed.

In some configurations, the apparatus 102 may include a display 132. Images of scenes and/or objects that are located within the field of view of the optical system 106 may be captured by the image sensor(s) 104. The images that are being captured by the image sensor(s) 104 may be presented on the display 132. In some configurations, these images may be displayed in rapid succession at a relatively high frame rate so that, at any given moment in time, the objects that are located within the field of view of the optical system 106 may be presented on the display 132. The one or more images obtained by the apparatus 102 may be one or more video frames and/or one or more still images. For example, the display(s) 132 may be configured to output a view of one or more objects (e.g., signs, lane markers, landmarks, etc.).

The display(s) 132 may be integrated into the apparatus 102 and/or may be coupled to the apparatus 102. For example, the apparatus 102 may be virtual reality headset with integrated displays 132. In another example, the apparatus 102 may be a computer that is coupled to a virtual reality headset with the displays 132. In yet another example, the apparatus 102 may be a vehicle.

The apparatus 102 (e.g., processor 112) may optionally be coupled to, be part of (e.g., be integrated into), include, and/or implement one or more kinds of devices. For example, the apparatus may be implemented in a vehicle equipped with one or more cameras.

The processor 112 may be configured to implement one or more of the methods disclosed herein. For example, the processor 112 may be configured to locate one or more objects (e.g., produce 3D object pose information).

The processor 112 may include and/or implement an image obtainer 114, an inter-frame associator 116, a pose estimator 118, a pose refiner 120, and/or a rolling shutter compensator 122. It should be noted that one or more of the elements illustrated in the apparatus 102 and/or processor 112 may be optional. For example, the apparatus 102 may not include and/or may not implement one or more of the image sensor(s) 104, the optical system(s) 106, the communication interface(s) 108, the antenna(s) 110, the processor 112, the memory 126 and/or the display(s) 132 in some configurations. Additionally or alternatively, the inter-frame associator 116, the pose estimator 118, the pose refiner 120, and/or the rolling shutter compensator 122 may or may not be included and/or implemented. Additionally or alternatively, one or more of the elements illustrated in the processor 112 may be implemented separately from the processor 112 (e.g., in other circuitry, on another processor, on a separate electronic device, on a graphics processing unit (GPU), etc.).

The processor 112 may include and/or implement an image obtainer 114. One or more images (e.g., image frames ("frames"), video, video feed(s), burst shots, etc.) may be provided to the image obtainer 114. For example, the image obtainer 114 may obtain image frames from one or more image sensors 104 (e.g., normal camera(s), wide-angle camera(s), fisheye camera(s), telephoto camera(s), etc.). For instance, the image obtainer 114 may receive image data from one or more image sensors 104 and/or from one or more remote cameras (e.g., separate cameras, external cameras, etc.). As described above, the image(s) may be captured from the image sensor(s) 104 included in the apparatus 102 or may be captured from one or more remote camera(s). For example, the images may be captured from one or multiple cameras (at different locations, for example).

In some configurations, the image obtainer 114 may request and/or receive one or more images (e.g., image frames, video, etc.). For example, the image obtainer 114 may request and/or receive one or more images from a remote device (e.g., external camera(s), vehicle-mounted camera, remote server, remote electronic device, etc.) via the communication interface 108.

In some configurations, the apparatus 102 (e.g., processor 112) may obtain object detection information. The object detection information may indicate whether one or more objects (e.g., particular object types) are detected in one or more images. For example, the object detection information may indicate whether one or more objects (e.g., traffic signs, traffic lane markers, traffic lights, road markers, pedestrians, construction cones, barriers, characters (e.g., letters, numbers, etc.), etc.) appear in one or more image frames. The object detection information may indicate a location of the object(s). For example, the object detection information may indicate the location of one or more objects (e.g., object points) in an image (e.g., pixel location). Additionally or alternatively, the object detection information may indicate one or more object types. For example, the object detection information may indicate whether a sign has a particular shape (e.g., rectangular shape, diamond shape, octagonal shape, square shape, circular shape, etc.) and/or a sign type (e.g., stop sign, yield sign, caution sign, street name sign, etc.). Additionally or alternatively, the object detection information may indicate whether one or more lane markers are a particular type (e.g., double, dashed, solid, single, solid, and single combination, white, yellow, etc.).

In some configurations, the object detection information may include one or more points (e.g., corners, keypoints, feature points, etc.) of one or more objects. For example, the object detection information may indicate one or more corners of a sign, lane marker endpoints, one or more points on a lane marker, point cloud for an object (e.g., lane marker, sign, etc.), etc.

In some configurations, the apparatus 102 (e.g., processor 112) may include and/or implement an object detector. The object detector may detect one or more objects in one or more images (e.g., image frames). For example, the object detector may search an image (and/or one or more regions of interest of an image) for one or more objects. In some approaches, the object detector may detect one or more object points (e.g., corners, keypoints, feature points, etc.). The object detector may perform matching between the detected object points and one or more object templates. For example, one or more object templates may be stored in memory 126. An object template may represent a form, shape, pattern, one or more features (e.g., feature set), and/or one or more characteristics of a type of object. For example, an object template may be a template of a stop sign, indicating corners of an octagonal shape. The object detector may perform matching (e.g., transforms (e.g., scaling, rotation, translation, etc.) and/or correlation, etc.) between one or more detected points and an object template. If the detected point(s) match an object template to a degree (e.g., if a correlation or matching score is greater than a matching threshold), the object detector may indicate object detection information (e.g., a detection of an object and/or a set of points corresponding to the object, object location in the image, object point location(s) in the image, etc.).

Additionally or alternatively, the apparatus 102 (e.g., processor 112) may receive object detection information from another device. For example, the apparatus 102 may receive object detection information from a remote device that performs object detection on one or more image frames.

In some configurations, the apparatus 102 (e.g., processor 112) may obtain camera pose information. Camera pose information may indicate position and/or orientation information of one or more cameras (e.g., image sensor(s) 104 and/or optical system(s) 106). For example, camera pose information may indicate a position and/or orientation of a camera in a 3D coordinate system (e.g., world coordinates). In some configurations, the camera pose information may be 6 DOF camera pose information. A camera pose may correspond to a frame. For example, the apparatus 102 may obtain a camera pose corresponding to each frame.

In some configurations, the apparatus 102 (e.g., processor 112) may include a camera pose obtainer. The camera pose obtainer may obtain the camera pose information. In some implementations, the apparatus 102 may include a positioning device. For example, the apparatus 102 may include a global positioning system (GPS) device, gyroscope (e.g., gyroscope sampled at 100 hertz (Hz) or more, etc.), inertial measurement unit, an inertial navigation unit, one or more accelerometers (e.g., accelerometer sampled at 100 Hz or more, etc.), a tilt sensor, and/or gravity sensor, etc. The positioning device may provide positioning information to the camera pose obtainer. The camera pose obtainer may utilize the positioning information to determine the camera pose(s). For example, the camera pose obtainer may determine the camera pose relative to the positioning information. For instance, the camera pose obtainer may account for position and/or orientation differences between the positioning device and the camera(s) (e.g., image sensor(s) 104 and/or optical system(s) 106). In some approaches, the camera pose obtainer may transform (e.g., translate, rotate, etc.) the positioning information from the positioning device to determine a camera pose at the location of the camera.

In some configurations, one or more of the following coordinate systems may be utilized in accordance with the systems and methods disclosed herein. Earth coordinates or a global frame (e.g., earth-centered earth-fixed (ECEF) coordinates in world geodetic system 1984 (WGS 84)) may be utilized. A local frame (e.g., visual inertial odometry (VIO) spatial frame) may be an earth-fixed frame with arbitrary origin (translation) and orientation. A vehicle body frame (e.g., a(t)) may be fixed to the vehicle with a designated origin, oriented along the vehicle with x-right, y-forward, and z-up, for example. A camera frame (e.g., c(t)) may be fixed to the vehicle, origin at camera center, while facing forward, oriented with x-right, y-down, and z-forward, for example. An accelerometer frame (e.g., b(t)) may be fixed to the accelerator in an inertial measurement unit (IMU) sensor, for example. A gyroscope frame (e.g., g(t)) may be fixed to the gyroscope in the IMU sensor, for example. It should be noted that other coordinate systems and/or orientations may be utilized in accordance with the systems and methods disclosed herein.

The processor 112 may include and/or implement an inter-frame associator 116. The inter-frame associator 116 may associate one or more objects between frames (in a series of frames, for example) to produce two-dimensional (2D) object location data (e.g., an inter-frame association, a track, etc.). For instance, the inter-frame associator 116 may determine whether an object in one frame matches (e.g., is the same as) an object in another frame. In particular, the inter-frame associator 116 may determine a correspondence between objects in multiple frames. In some configurations, the inter-frame associator 116 may associate one or more objects between frames based on one or more object pixels (e.g., one or more pixels of an object in one or more images), one or more object features (e.g., object points, feature points, keypoints, corners, center points, etc.), and/or one or more pixel camera positions (e.g., camera pose information corresponding to one or more pixels). In some configurations, the inter-frame associator 116 may perform inter-frame association for one or more road signs. Additionally or alternatively, the inter-frame associator 116 may perform inter-frame association for one or more lane markers. Examples of inter-frame association are given in connection with one or more of FIGS. 3 and 4.

In some configurations, the 2D object location data produced by object association may be a set of object detections (e.g., associated object detections, associated object points, associated pixels, etc.) for two or more frames. In some approaches, the 2D object location data may be referred to as an inter-frame association or a track (or "tracklet") for each object. For example, associating objects between frames may produce a track of object detections for one or more objects.

In some configurations, performing inter-frame association may include determining an association cost between objects in different frames (e.g., objects detected in different frames). In some approaches, the association cost may be based on points (e.g., object points, corners, feature points, keypoints, pixels, etc.) between frames and/or camera poses for the frames. Additionally or alternatively, the association cost may be based on an epipolar constraint. For example, the association cost may be a sum of epipolar costs for pairs of points (e.g., object points) between frames. In some approaches, if all the association costs are greater than an association cost threshold for an object, then the object may not be associated with any previously appearing (e.g., detected) object. Additionally or alternatively, the lowest association cost between a pair of objects may indicate an association (e.g., an association between an object in a current frame and an object or track from a previous frame). An example of inter-frame association is provided in connection with FIG. 4.

In some configurations, the inter-frame associator 116 may perform inter-frame association in accordance with one or more aspects of the following approach. The interframe associator 116 may rely on geometry to associate object detections across frames (e.g., successive frames). In some implementations, low level image features may not be available at this stage of a processing pipeline. Geometric considerations may be adequate in approaches where pose information (e.g., camera pose) is accurate and object (e.g., sign, lane marker, etc.) features are relatively well separated.

Object detections may be associated with each other across frames to obtain tracks. A track may be a set of detections for a specific physical object. The inter-frame associator 116 may perform inter-frame association causally to appropriately associate new detections (e.g., one or more detections corresponding to a new frame) either with one or more existing tracks or to spawn one or more new tracks. In some approaches, the association of new detections with existing tracks may be formulated as a weighted bipartite graph matching problem.

Some configurations of the systems and methods disclosed herein may be implemented in accordance with one or more of the mathematical expressions provided herein. For convenience, some of the terms used herein may be denoted as follows in Table (1). It should be noted that although signs and lane markers are given as examples of objects that may be located in accordance with the systems and methods disclosed herein, one or more other objects may be located in some configurations.

TABLE (1)

| | |
|---|---|
| $f_n$ | Camera frame n |
| $t_n$ | Timestamp of frame n |
| $P_n$ | Camera pose (e.g., 6 DOF camera pose) corresponding to frame n |
| $s_{n,i}$ | i-th sign detected within frame n |
| $s_{n,i,j}$ | j-th corner of i-th sign detected within frame n |
| $l_{n,i}$ | i-th lane marker detected within frame n |
| $l_{n,i,j}$ | j-th point of i-th lane marker detected within frame n |
| $s_i$ | i-th sign tracks final state after inter-frame association; $\{s_{n,k}\}$ are associated observations |
| $l_i$ | i-th lane marker tracks final state after inter-frame association; $\{l_{n,k}\}$ are associated observations |
| $S_i$ | i-th sign (after triangulation of $s_i$) |
| $S_{i,j}$ | 3D coordinates of j-th corner of i-th sign |
| $L_i$ | i-th lane marker (after triangulation of $l_i$) |
| $L_{i,j}$ | 3D coordinates of j-th control point of i-th lane marker |
| $S_i$ | i-th sign after multi-journey association, $\{S_i^{(k)}\}$ are associated 3D signs |
| $L_i$ | i-th lane marker after multi-journey association, $\{L_i^{(k)}\}$ are associated 3D signs |

In some configurations, the inter-frame associator 116 may associate objects between frames based on an association cost. For example, the weighted bipartite graph matching formulation may rely on an association cost. The inter-frame associator 116 may spawn one or more new tracks for one or more detections that have a high cost of associating (e.g., greater than a threshold association cost) with all existing tracks. In some approaches, the tracks may be denoted $\{\lambda_i\}_{i \in I}$, and $\{y_{n,j}\}_{j \in J}$ may denote the pixel measurements for the $|J|$ objects detected on frame n. For each track $\lambda_i$, $d_i$ may denote the gap since the previous measurement (e.g., the last measurement for $\lambda_i$ was received at frame $n-d_i$). $C_{n,ij}$ may denote the cost of associating measurement $y_{n,j}$ with track $\lambda_i$. For a given measurement (e.g., $y_{n,j}$), a new track may be spawned if $\min_{i \in \mathcal{J}} C_{n,ij}$ is too high. This is to avoid forcing an association when there is none (e.g., when the detections on the current frame are all new and do not correspond to any previous object (e.g., any existing track)). $J_N \subseteq J$ may denote the subset of measurements for which new tracks will be spawned. For the remaining measurements, the inter-frame associator 116 may obtain (e.g., determine) the inter-frame association (e.g., the assignment to tracks) by solving a weighted bipartite matching problem on the $$\text{matrix } C_n = [C_{n,ij}]_{i|d_i<w, j\in J \setminus J_N}.$$

It should be noted that the interframe associator 116 may ignore one or more tracks that have not received measurements (e.g., detection) within an association window (e.g., for a number of successive frames). The association window may be utilized for computational reasons and/or because purely geometry based association cost metrics may become increasingly unreliable as distance between the two poses grows. The interframe associator 116 may update $d_i=0$ if a measurement (e.g., detection) was associated to track $\lambda_i$ in the current frame. Otherwise, the inter-frame associator may update $d_i \to d_i+1$. In some approaches, the cost of associating a measurement to a track may be the cost of associating with the most recent measurement for that track.

In some configurations, the cost of associating two measurements for objects (e.g., signs and lanes) is given in Equation (1). The basis of the cost may be an epipolar constraint. For example, the cost of associating a point p on frame i and point q on frame j is given in Equation (1).

$$\frac{|p^T F_{ij} q|^2}{\|F_{ij}^T p\|^2 + \|F_{ij} q\|^2} \quad (1)$$

In Equation (1), $F_{ij}$ is a fundamental matrix corresponding to two camera poses.

In some configurations, the inter-frame associator 116 may determine a cost for sign association. In some approaches, the cost of associating two sign detections may be the sum of the costs for each pair of points (e.g., corners, vertices, etc.). The matching between vertices itself may be obtained by solving another weighted bipartite matching problem.

In some configurations, the inter-frame associator 116 may determine a cost for lane association. In some configurations, each lane detection may be represented by a point cloud in pixel domain. The point cloud may be simplified by approximating the point cloud with a line in some approaches. The cost of associating two lane detections may be the sum of pairwise epipolar costs for points sampled from the lines. This approach may be adequate, and in most cases may be able to associate detections even across tight clover leaves.

The pose estimator 118 may estimate 3D pose data of one or more of the objects based on the 2D object location data (e.g., inter-frame association, track, etc.). For example, the pose estimator 118 may estimate the location (e.g., 6 degree of freedom (DOF) information) of one or more objects in a 3D coordinate system (e.g., world coordinates) based on the 2D object location data (e.g., interframe association, one or more tracks, etc.). For example, the pose estimator may estimate pose data for one or more signs (e.g., road signs) and/or one or more lane markers. In some configurations, estimating the 3D pose may be based on object type. For example, estimating the 3D pose of a sign may be estimated differently than the 3D pose of a lane marker.

In some configurations, estimating the 3D pose for a sign may include applying a mid-point algorithm for each sign corner to estimate 3D coordinates for each corner. In some approaches, estimating the 3D pose for a sign may include one or more of the following aspects. Following association, $\{s_{n,i}\}$ may denote all detections of the i-th sign. $s_{n,i,j}$ may denote the j-th corner of the i-th sign. Since the camera poses $\{P_n\}$ may be known, the pose estimator 118 may utilize a mid-point algorithm to estimate the 3D coordinates of the corners $\{\hat{S}_{i,j}\}$. It should be noted that these corners may not necessarily be co-planar (while signs may be almost coplanar, unless they are badly damaged). An example of pose estimation for a sign is provided in connection with FIG. 5.

In some configurations, the pose estimator 118 may perform one or more operations to estimate a lane marker pose (e.g., 3D pose data of a lane marker). Estimating a 3D pose data of a lane marker may include estimating a road normal vector. The road normal vector may be a vector that is normal to the road surface. In some approaches, the road surface may be represented as one or more planes. The pose estimator 118 may estimate the road normal vector in real time. For example, the pose estimator 118 may estimate and/or update the road normal vector online (while a vehicle is driving on the road, for example). In some approaches, the road normal vector may be estimated offline (e.g., initially estimated offline), after which the road normal vector may be updated online (in real time, for example).

In some configurations, road surface estimation may include one or more of the following aspects. For example, the apparatus 102 (e.g., processor 112, pose estimator 118, etc.) may perform one or more of the following operations to estimate a road surface and/or to estimate a road normal vector.

Mapping lane detections onto the 3D world may utilize knowledge of the road surface. Roads may be described locally by their tangent planes, which may utilize a road normal and an offset. In particular, if $h \in R^3$ denotes the vector from the camera center to the road plane along the road normal expressed in the camera frame, then $\|h\|$ may denote the offset and $h/\|h\|$ may denote the road normal.

This approach may result in the road surface being approximated by a convex hull of a sequence of planes that are tangent to the road surface at the camera location. In some implementations, the camera may be rigidly mounted on a vehicle. Since the vehicle frame may be nearly rigidly related to the road surface that it drives on, the road-normal, when expressed in the camera frame, may be nearly constant. This is a premise that may support the approach described below to estimate the road normal.

During offline calibration, the pose estimator 118 may measure the height from the road surface to the camera. The height or offset measured along a calibrated road normal may be denoted $\|h\|$. While online (e.g., during a drive, during runtime, etc.), the pose estimator 118 may continuously adjust the road normal estimate (e.g., $h/\|h\|$). While the offset (e.g., $\|h\|$) can also change during a drive, the offset may be ignored online (e.g., during the drive) in some approaches, since inverse perspective projection is less sensitive to the offset than it is to the road normal.

As follows, the "road normal" may refer to the road normal representation in the camera frame. Road normal estimation may be achieved based on an offline calibration to obtain an initialization. For example, road normal estimation may include performing an online (e.g., runtime) adjustment of the road normal during a drive.

An offline calibration may be performed in some configurations of the systems and methods disclosed herein. For example, an offline calibrated road normal value may be utilized for initialization of the online (e.g., runtime) adjustment. One example of a setup for offline calibration may include a wall and floor (of a garage, for example) with clearly marked points (e.g., 10 points on the wall and 6 points on the floor). A total station may be utilized to measure all of the points accurately in a local 3D coordinate system. Using the ground points, the road normal may be estimated in local 3D coordinates. Given a camera mounted in a vehicle, several pictures may be taken of the wall. The wall points in the image may be annotated after appropriate un-distortion. Using the image points and the wall point coordinates in the local frame, an algorithm (e.g., the efficient Perspective-n-Point (ePnP) algorithm) may be utilized to estimate the 6 DOF local frame to camera frame transformation. This transformation may be used to convert the road normal to the camera frame coordinates.

Road normal estimation (e.g., online adjustment) may be performed in some configurations of the systems and methods disclosed herein as follows. The road normal can change during a drive for several reasons. For example, the road normal may be sensitive to vehicle suspension, and hence may change by a few degrees with passenger and/or load configuration. Even a small movement of the camera due to vibrations during a drive can cause an appreciable change in the road normal. Experiments showed that the mean absolute lane width estimation errors may be reduced by about 50% with online adjustment.

Online adjustment may be set up as a non-linear least squares problem. In some approaches, online adjustment may rely on the fact that the horizon may not change much in the image in an automotive use case. The camera height (measured along the calibrated road normal, for example) from offline calibration may be denoted $\|h\|$. A fixed set of points that lie below the horizon in pixel domain may be utilized (e.g., chosen). The rays from the camera center through these points may be expected to intersect the ground. Hence, these points may only capture the prior knowledge of the approximate horizon and may not require any knowledge of road segmentation. The point coordinates in an ideal camera frame may be denoted $U \triangleq \{u_i\}$, $u_i=[u_{i,0}, u_{i,1}]^T$. The current estimate of the road normal may be denoted $\hat{h}$ ($\|\hat{h}\|=1$). From each camera pose, $P_n$, $\hat{h}$ may be used to obtain an inverse perspective map of U to get the set of 3D points in the spatial frame (e.g., $W_n \triangleq \{w_{n,i}\}$, $w_{n,i} \in R^3$, where $R^3$ denotes three dimensional space).

Equation (2) expresses a formulation of $w_{n,i}$.

$$w_{n,i} = c_n + R_n u_i \frac{\|h\|}{\hat{h}^T u_i} \qquad (2)$$

In Equation (2), $c_n$ and $R_n$ are the center and orientation of the camera in the spatial frame, respectively.

It should be noted that all points in $W_n$ may be coplanar by construction. If $\hat{h}$ is equal to the correct road normal, then the points in $W_n$ will be on the local tangent to the road surface for all n. Furthermore, for all camera poses (denoted $\aleph$, for example), on a planar stretch of the road, the points $$W_\aleph \triangleq \{w_{n,i}\}_{i,n \in \aleph}$$

will all be coplanar. But if $\hat{h}$ is incorrect, $W_n$ may not coincide with the road surface for any n. While the correct road normal guarantees co-planarity, the converse is certainly not true. This is evident in the following scenario: motion is along cameras z-axis, and the road is flat with its normal along the camera y-axis. In this case, any $\hat{h}$ in the xy-plane of the camera frame will result in a planar $W_\aleph$. In practice, such coincidences may be rare. Accordingly, the cost function may be designed to capture the co-planarity of $W_\aleph$.

In some approaches, the cost function (for road normal, for example) may be the sum of squared distances of points in $W_\aleph$ to their best plane fit. For example, the cost function (for road normal, for instance) may be given by Equation (3).

$$J_\aleph(\hat{h}) = \sigma_{min}\left(\sum_{w \in W_\aleph} (w-\mu_\aleph)(w-\mu_\aleph)^T\right) \qquad (3)$$

In Equation (3), $\sigma_{min}$ is a smallest singular value of a matrix, $W_\aleph$ is a set of points obtained using inverse perspective mapping, and $J_\aleph$ denotes a cost function to be minimized. $\mu_\aleph$ is the mean of the points in $W_\aleph$. The final estimate may be given by Equation (4).

$$\hat{h}_{opt} = \underset{h}{\operatorname{argmin}} \sum_\aleph J_\aleph(h) \qquad (4)$$

In Equation (4), h is a variable over which optimization is performed (e.g., a variable being optimized over).

It should be noted that surrogates for the smallest singular value may be used, such as the harmonic mean of singular values. The harmonic mean of singular values may be expressed explicitly in terms of the matrix coefficients and hence may be computationally cheaper than computing the smallest singular value.

The summation in Equation (4) is may be performed over a number of short segments of the journey, each segment being short enough to be planar. Because co-planarity may not be a sufficient condition for $\hat{h}$ to be accurate, the solution to the optimization problem in Equation (4) may be valid only if it is sufficiently close in angle to the value provided by offline calibration (e.g., within an angular threshold). The road normal estimate may be updated by the pose estimator 118 as described above. In some configurations, the road normal estimate may be updated every few tens of meters.

The pose estimator 118 may perform lane (e.g., lane marker) reconstruction in accordance with one or more of the following aspects in some configurations. $\hat{h}_n$ may denote the estimated road normal at pose $P_n$. Using Equation (2) for example, the pose estimator 118 may determine (e.g., estimate) 3D lane marker coordinates (e.g., $L_{n,i,j} \in R^3$) corresponding to each lane marker detection point $l_{n,i,j}$. A single journey triangulation may be performed online. Accordingly, local representations (e.g., only local representations) for lanes at this stage may be determined.

In some configurations, the processor 112 may include and/or implement a pose refiner 120. The pose refiner 120 may refine 3D pose data for one or more objects. For example, the pose refiner 120 may refine 3D sign pose data and/or 3D lane marker pose data. In some approaches, refining the 3D pose data may be based on a shape constraint. For example, the shape constraint may constrain the 3D pose data to a particular shape and/or form (e.g., planar shape, quasi-planar shape, curved shape, arbitrary shape, etc.). In some examples, the shape constraint may be a planarity constraint. For signs, for example, the planarity constraint may constrain a 3D representation of a sign to a plane. For lane markers (or other road markings), for example, the planarity constraint may constrain the representation of the lane markers (or other road markers) to one or more planes. In some examples, the 3D pose data may be constrained to a quasi-planar shape. For example, signs may exhibit some variability across the sign (due to manufacturing imperfections and/or damage, etc., for example) such that the sign is not perfectly planar.

In some approaches, refining 3D sign pose data may include one or more of the following aspects. The pose refiner 120 may reparametrize the sign to be represented by the center, axis, and size of the sign. Given the output of the pose estimator 118 (e.g., the output of the mid-point algorithm), the center may be equal to the centroid of the corners, the axis may be obtained by determining the best plane fit, and the size may be estimated. This representation of the 3D sign pose data may be denoted $\bar{S}_i$. The pose refiner 120 may produce a final triangulation output (e.g., $S_i$) by minimizing a re-projection error based optimization metric with $\bar{S}_i$ serving as the initial value. Estimating 3D sign pose data and/or refining 3D sign pose data may be referred to as sign reconstruction.

An example of some test results for sign poses after triangulation is given in Table (2).

TABLE 2

| Sign ID | t1 | t2 | t3 | rotX | rotY | rotZ | w | h |
|---|---|---|---|---|---|---|---|---|
| 1 | 29.91486 | 1.375495 | 2.352116 | 92.85079 | −5.76711 | 102.1214 | 0.81337 | 0.83308 |
| 2 | 39.97295 | 1.421644 | 2.501212 | 94.56758 | −5.25798 | 93.52558 | 0.90244 | 0.56177 |
| 3 | 67.57106 | 5.14541 | 1.479294 | 97.15464 | −2.43011 | 64.88958 | 1.5997 | 1.2426 |
| 4 | 49.93426 | 1.481124 | 2.189317 | 92.34452 | −5.58219 | 91.19354 | 0.84914 | 0.66723 |
| 5 | 60.00654 | 1.505612 | 2.089895 | 92.17753 | −4.66726 | 93.33553 | 0.66002 | 0.65546 |

In some configurations, refining 3D sign pose data may include determining a reprojection error (with a cost function, for example) for one or more object points (e.g., individual sign corners) and adjusting (e.g., optimizing) each of the object point(s) based on the reprojection error (e.g., minimizing reprojection error). Additionally or alternatively, refining 3D sign pose data may include fitting points (e.g., sign corners) to a plane. Additionally or alternatively, refining 3D sign pose data may include reparametrizing the sign to a representation with a best plane fit. Additionally or alternatively, refining 3D sign pose data may include determining a reprojection error (with a cost function, for example) for whole signs and adjusting (e.g., optimizing) the 3D sign pose data based on the reprojection error (e.g., minimizing reprojection error).

In some approaches, pose refining for signs may include two steps. A first step may include corner optimization followed by sign pose estimation. Corner optimization may be utilized as an initialization for the second step. The second step may include sign pose optimization. More specifically, the first step may include corner optimization, with a cost being re-projection error. Corner optimization may be performed without perturbing the depth (along camera-Z) of the corners to a degree (e.g., without perturbing beyond a threshold degree). Corners may be optimized individually, and may not be treated jointly. In the second step (optimizing sign pose, for example), the cost may be expressed as given in Equation (5).

$$\text{Cost} = \text{Sign\_Error}_{reprojection} = \sum_{n,i} (\rho(\text{distance}(s_{n,i}, P_n \circ S_i))) \quad (5)$$

In Equation (5), ρ(.) denotes a weighting function (e.g., a robust weighting function such as Tukey or Huber), the operator ∘ denotes projection from 3D to the image plane, and distance(x, y) denotes a metric that measures the distance between x and y. In some approaches, the camera pose may be fixed.

In some approaches, estimating and/or refining 3D lane marker pose data may include one or more of the following aspects. The pose estimator 118 and/or pose refiner 120 may determine (e.g., estimate) 3D pose data for a lane marker by fitting a spline to a number of control points of the 3D lane marker coordinates. For example, a local representation for the i-th lane marker may be obtained by fitting a natural cubic spline with a fixed number of control points to a configurable number of the most recent points in $\{L_{n,i,j}\}$. The control points obtained from this spline fitting may constitute a valid representation since a natural cubic spline is uniquely defined by its control points. Each lane marker may be described by multiple overlapping natural cubic splines. It should be noted that the spline representation may constitute a geometric representation. Topological structure that includes semantic information such as lane mergers, lane splits, lane types, etc., may be inferred during multi-journey triangulation.

Other approaches may be used for geometric and/or topological description of lanes (e.g., clothoids, which are purely geometric, and polylines with 0.5 meter (m) spacing that are geometric and topological). A road network may be described locally and globally both topologically and geometrically, with polylines for local geometric description. Cubic splines instead may be advantageous for generating accurate geometric representation locally and for computational ease of fitting.

In some configurations, the pose refiner 120 may refine lane marker pose data (e.g., may adjust spline parameters). In some approaches, the pose refiner 120 may refine (e.g., optimize) the spline parameters by minimizing a reprojection error on the image plane. Refining the spline parameters may be accomplished in accordance with Equation (6), for example.

$$\text{Cost} = \text{Lane\_Error}_{reprojection} = \sum_{n,i} (\rho(\text{distance}(l_{n,i}, P_n \circ L_i))) \quad (6)$$

In Equation (6), ρ(.) denotes a weighting function (e.g., a robust weighting function such as Tukey or Huber), the operator ○ denotes projection from 3D to the image plane, and distance(x, y) denotes a metric that measures the distance between x and y.

In some configurations, the processor 112 may include and/or implement a rolling shutter compensator 122. The rolling shutter compensator 122 may compensate for rolling shutter of at least one camera that captures the images (e.g., set of frames, video, etc.). In some approaches, compensating for rolling shutter may include interpolating camera pose variables for one or more points of one or more objects. For example, because the camera may be moving during frame capture, and pixel data may be captured in a sequence, camera pose information may change during capture. The rolling shutter compensator may interpolate camera pose information for one or more pixel groups (e.g., pixel rows) and/or for one or more individual pixels. This may help to compensate for the rolling shutter effect.

More specifically, for example, a camera (e.g., image sensor 104) may capture pixel data in a progressive fashion (e.g., row-by-row of pixels, column-by-column of pixels, etc.). A camera pose may be associated with each frame. When the camera is in motion (particularly at high speeds, for example), the camera pose may vary over the frame capture (e.g., from row-to-row of pixels and/or column-to-column of pixels). The rolling shutter compensator 122 may compensate for the rolling shutter by interpolating between camera pose variables based on the point (e.g., pixel) location in the image and/or the timing of the pixel capture (e.g., exposure timing from camera specifications) corresponding to the point. Rolling shutter compensation may be performed in conjunction with pose estimation and/or pose refinement as described herein. Examples of rolling shutter compensation are provided in connection with FIG. 6.

In some configurations, the apparatus 102 (e.g., inter-frame associator 116, pose estimator 118, pose refiner 120, etc.) may utilize a set of frames that is obtained from only one camera. For example, some configurations of the systems and methods disclosed herein may be utilized to locate objects in 3D space while using only one camera. Other configurations may use multiple cameras.

It should be noted that one or more of the elements or components of the electronic device may be combined and/or divided. For example, the image obtainer 114, the inter-frame associator 116, the pose estimator 118, the pose refiner 120, and/or the rolling shutter compensator 122 may be combined. Additionally or alternatively, one or more of the image obtainer 114, the inter-frame associator 116, the pose estimator 118, the pose refiner 120, and/or the rolling shutter compensator 122 may be divided into elements or components that perform a subset of the operations thereof.

In some configurations, the apparatus 102 may perform one or more operations based on the object location information (e.g., 3D object pose data). For example, the apparatus 102 may produce a 3D map of a scene captured by the image sensor(s) 104. Additionally or alternatively, the apparatus 102 may send (e.g., upload) one or more kinds of data (e.g., camera pose information, image data, detection data, refined 3D pose data, etc.) to a mapping database. The mapping database may store the one or more kinds of data. The mapping database may be stored on the apparatus 102 or on another device. In some configurations, the one or more kinds of data may be sent to another device for mapping the object(s) (e.g., a mapping device). For example, a set of apparatuses 102 (e.g., vehicles, drone swarms, etc.) may provide (e.g., send, transmit, etc.) image data, camera pose data, object detection information, object location information, refined 3D pose data, etc., to another apparatus (e.g., computer, server, etc.) that may map one or more objects based on the data. In some configurations, the apparatus 102 may receive a map from the other apparatus (e.g., mapping device). The map may be based on data (e.g., refined 3D pose data) sent to the other apparatus (from the apparatus 102 and/or one or more other apparatuses). For example, a mapping device may produce a map based on data (e.g., refined 3D pose data) sent to the mapping device from one or more vehicles. In some approaches, the apparatus 102 (or another device, for example) may look up one or more kinds of data (e.g., refined 3D pose data, the map, etc.) stored in the mapping database. Additionally or alternatively, the apparatus 102 may perform one or more control operations based on the object location information. For example, the apparatus 102 may control a vehicle (e.g., driving) based on the object location information. For instance, the apparatus 102 may control vehicle speed, maneuvering (e.g., turning, braking, accelerating, avoiding a collision, etc.), parking, signaling, etc., based on the object location information.

Figure 2:
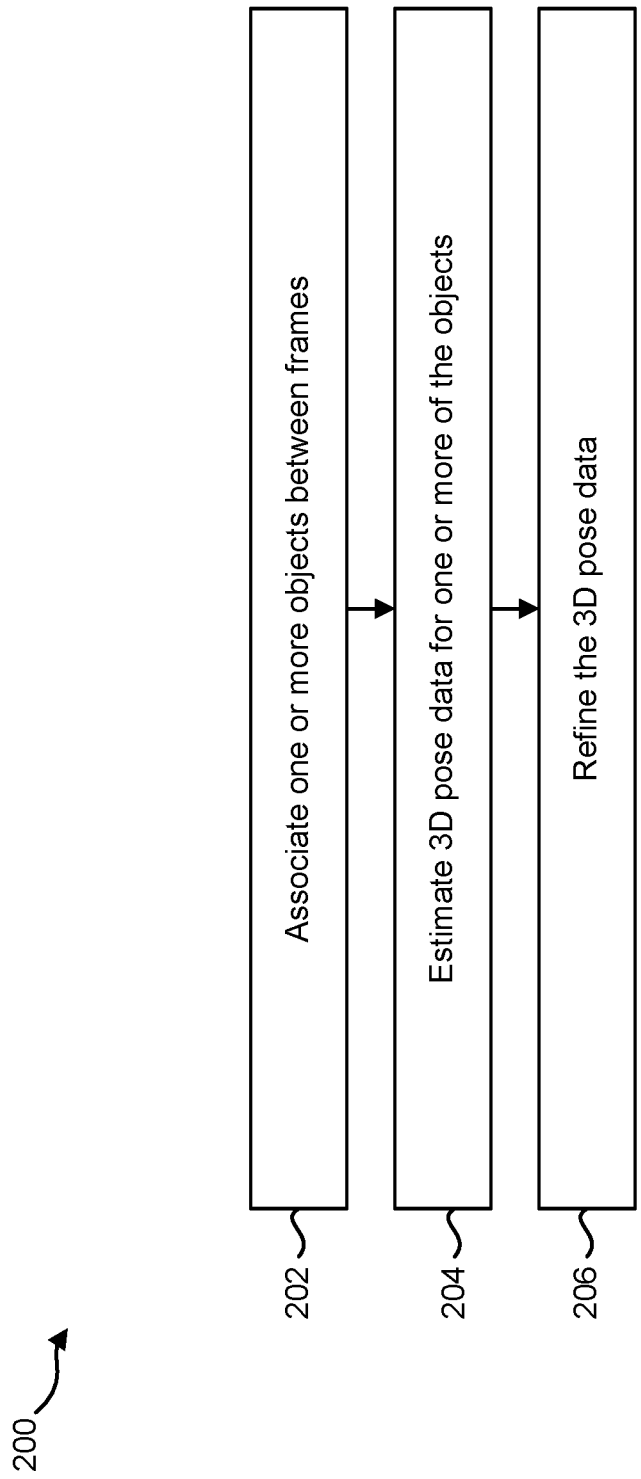
FIG. 2 is a flow diagram illustrating one configuration of a method for object location.

FIG. 2 is a flow diagram illustrating one configuration of a method 200 for object location. The method 200 may be performed by the apparatus 102, for example.

The apparatus 102 may associate 202 one or more objects between frames. This may be accomplished as described in connection with FIG. 1. For example, the apparatus 102 may associate one or more objects (e.g., object points, object corners, set of object points, etc.) between frames based on one or more object points and/or camera positions (e.g., obtained camera position for each frame, received camera position for each frame, etc.). For instance, inter-frame association may be performed based on object pixel(s), object feature(s), and/or pixel camera positions. Associating 202 one or more objects may produce 2D object location data (e.g., associations, tracks, etc.).

The apparatus 102 may estimate 204 3D pose data for one or more of the objects. This may be accomplished as described in connection with FIG. 1. For example, the apparatus 102 may estimate 204 3D pose data for one or more objects based on the 2D object location data.

The apparatus 102 may refine 206 the 3D pose data. This may be accomplished as described in connection with FIG. 1. For example, the apparatus 102 may refine 206 the 3D pose data based on a shape constraint (e.g., a planarity constraint).

In some configurations, the apparatus 102 may perform one or more operations based on the 3D pose data. For example, the apparatus 102 may map the 3D pose data, may control one or more vehicles based on the 3D pose data, and/or may send data (e.g., refined 3D pose data) to another apparatus (e.g., mapping device) for producing a map based on the data.

Figure 3:
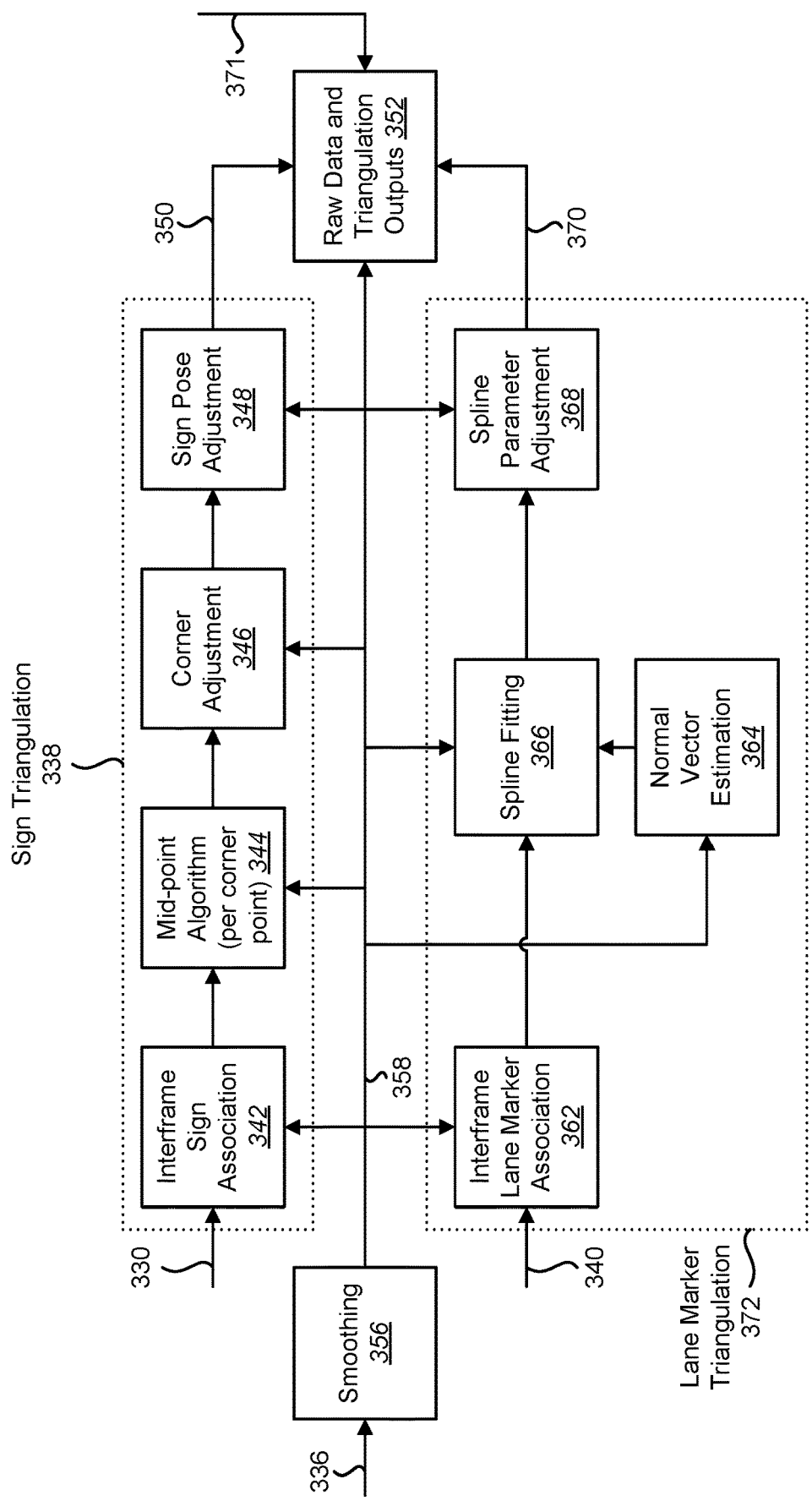
FIG. 3 is a block diagram illustrating an example of one or more elements and/or functions that may be implemented in accordance with some configurations of the systems and methods disclosed herein.

FIG. 3 is a block diagram illustrating an example of one or more elements and/or functions that may be implemented in accordance with some configurations of the systems and methods disclosed herein. For example, one or more of the elements and/or functions described in connection with FIG. 3 may be included in and/or performed by the apparatus 102 described in connection with FIG. 1. In particular, FIG. 3 illustrates an example of sign triangulation 338 and an example of lane marker triangulation 372 that may be implemented in accordance with some configurations of the systems and methods disclosed herein. Sign triangulation 338 may include interframe sign association 342, 3D sign pose data estimation (e.g., mid-point algorithm 344), and/or 3D sign pose data refinement (e.g., corner adjustment 346 and/or sign pose adjustment 348). Lane marker triangulation 372 may include interframe lane marker association 362, 3D lane marker pose data estimation (e.g., normal vector estimation 364), and/or 3D lane marker pose data refinement (e.g., spline fitting 366 and/or spline parameter adjustment 368).

In general, sign triangulation 338 may receive sign detection data 330 and camera pose data 336 (or smoothed camera pose data 358). In some configurations, after of series of processing steps the sign triangulation 338 may generate a time series with one or more of the following contents: timestamp, frameId, signId, and/or sign pose in the world frame. In general, the lane marker triangulation 372 may receive lane marker detection data 340 and camera pose data 336 (or smoothed camera pose data 358). In some configurations, after a series of processing steps, the lane marker triangulation 372 may generates a time series with one or more of the following contents: timestamp, frameId, laneId, and/or 3D spline parameters in the world frame. These outputs along with related raw observations from perception and positioning engines may be stored in a database, which may be used for map generation by a multi-journey mapper in some configurations. The multi-journey mapper may be included in the apparatus (e.g., apparatus 102) and/or may be included in a separate device (e.g., remote computer, remote server, etc.).

The interframe sign association 342 block may receive sign detection data 330 (e.g., sign vertex coordinates in the camera frame and/or sign shape type) for any sign(s) detected and/or tracked for one or more frames. In some configurations, the sign detection data 330 may include sign detections and/or tracking outputs from a perception engine. For example, the sign detection data may include a time series with one or more of the following contents: timestamp, vehicleId, frameId, signId, signType, and/or signCorners in the image plane. The interframe sign association 342 block may associate signs (e.g., sign detection data, points, sign corners, etc.) between frames. The mid-point algorithm 344 block may estimate 3D sign pose data based on the sign association(s). The corner adjustment 346 may adjust (e.g., optimize) the sign corners individually. The sign pose adjustment 348 block may refine (e.g., optimize) the sign pose data. For example, the sign pose adjustment 348 block may produce refined 3D sign pose data 350.

In some configurations, a smoothing 356 block may smooth camera pose data 336 (e.g., 6 DOF camera pose data) for one or more frames. For example, the smoothing 356 block may be or utilize a finite impulse response (FIR) filter to optionally smooth the camera pose data 336. The smoothing 356 block may produce smoothed camera pose data 358, which may be provided for sign triangulation 338 and/or lane marker triangulation 372. In other configurations, the original camera pose data 336 may be provided for sign triangulation 338 and/or lane marker triangulation 372. In some configurations, the camera pose data 336 may include the static intrinsics of the camera and/or a 6 DOF camera pose from a positioning engine. The camera pose data 336 may include a time series with one or more of the following contents: timestamp, vehicleId, frameId, and/or camera pose.

The interframe lane marker association 362 block may receive lane marker detection data 340 (e.g., lane marker point coordinates in a camera frame) for any lane(s) for one or more frames. In some configurations, the lane marker detection data may include lane detections from a perception engine. The lane marker detection data 340 may include a time series with one or more of the following contents: timestamp, vehicleId, frameId, laneId, laneType, startPoint (in the image plane), and/or endpoint (in the image plane). The interframe lane association 362 block may associate lanes between frames. The normal vector estimation 364 block may estimate a road normal vector (e.g., perform online road normal vector estimation and/or adjustment). The spline fitting 366 block may fit a spline to one or more lanes (in an inverse perspective mapping (IPM) domain, for example). The spline parameter adjustment 368 block may adjust (e.g., optimize) the spline parameter(s) for the lane marker(s) (e.g., 3D lane marker pose data). For example, the spline parameter adjustment 368 block may produce refined 3D lane marker pose data 370. The refined 3D sign pose data 350, the camera pose data 336 (and/or smoothed camera pose data 358), and/or the refined 3D lane marker pose data 370 may be stored in memory and/or sent to another device (e.g., a remote device, a server, etc.) as raw data and triangulation outputs 352. In some configurations, the raw data and triangulation outputs 352 may be combined with data 371 (e.g., sign pose data, lane marker data, camera pose data, etc.) from one or more other vehicles (for multi-journey mapping, for example).

In some configurations, one or more of the elements and/or functions described in connection with FIG. 3 may operate in accordance with one or more of the following aspects. Single-journey triangulation may process sign detection data 330, camera pose data 336 and/or lane marker detection data 340 to generate 6 DOF traffic sign pose data 350 in world coordinates and/or refined 3D lane marker pose data 370 (e.g., 3D fitted spline(s)) for lane segments. In some configurations, triangulation may be performed in real time, since 3D reconstruction of traffic signs and lanes may be needed by autonomous vehicles for a semantic understanding of the environment. For a pure mapping system, an offline implementation is also possible.

The sign and lane triangulation pipelines may be independent. In each case, the camera pose data 336 (and/or smoothed camera pose data 358) and the landmark detections (e.g., sign detection data 330 and/or lane marker detection data 340) may be utilized for inter-frame associations. In some configurations, object detection (e.g., perception) and object tracking may be performed jointly. For example object perception tracking may rely on image features, while inter-frame association (in a separate component, a mapping component, for example) may rely on camera pose information. Once tracks are obtained from inter-frame association, triangulation may be performed for traffic signs. The fact that traffic signs are planar (e.g., approximately planar) may be exploited in some configurations.

For lane markers, inverse perspective mapping (IPM) may be utilized to convert camera lane marker information onto the road surface in 3D. The IPM may be a sensitive transformation. For example, the fact that lane markers are long objects (that may stretch several tens of meters ahead of the vehicle, for instance) further amplifies the difficulty. One advantage of some of the configurations of the systems and methods disclosed herein is the estimation of road surface normal near the vehicle. For example, a calibrated value may be utilized initially. Periodic online correction of the road normal may be performed by ensuring that road points after IPM are planar.

In some configurations, not all of the detected objects (e.g., landmarks, signs, lane markers, etc.) may be triangulated. To ensure reliability of triangulated landmarks, for example, one or more pruning rules may be implemented for traffic signs based on the viewing angles and/or for lanes on the basis of track length.

Figure 4:
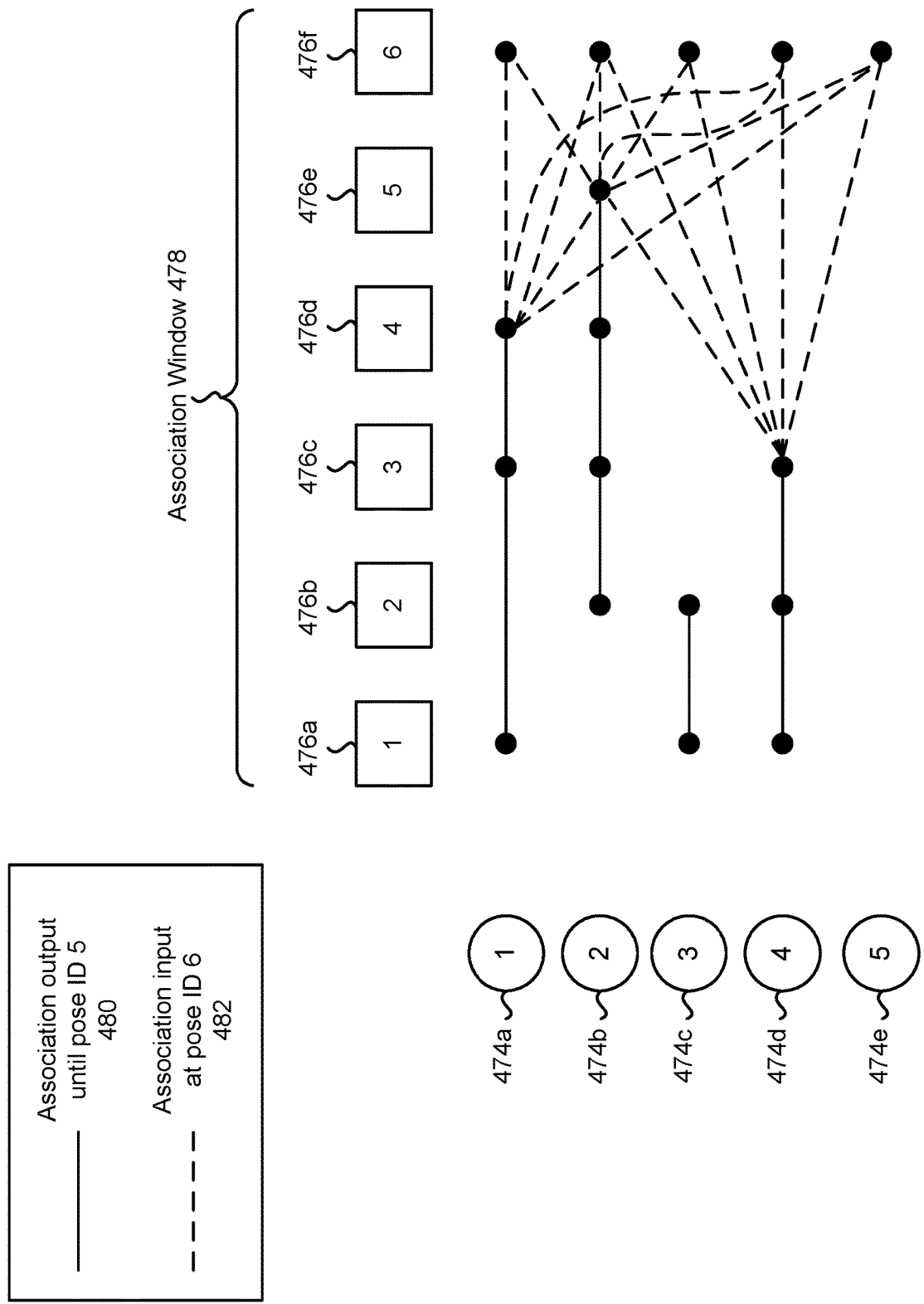
FIG. 4 is a diagram illustrating an example of an approach for inter-frame association.

FIG. 4 is a diagram illustrating an example of an approach for inter-frame association. In FIG. 4, dotted edges may represent potential associations. In particular, FIG. 4 illustrates a set of objects 474a-e (e.g., detected objects). FIG. 4 also illustrates a set of camera pose identifiers (IDs) 476a-f. In some configurations, interframe association may be performed within an association window 478 (e.g., a time period, a number of frames, etc.). For example, an association input 482 at pose identifier 6 (ID 6) 476f is illustrated. Also, an association output 480 at pose identifier 5 (ID 5) 476e is illustrated. Edges with very high cost may be removed (with a configurable threshold, for example). The cost of each association may be determined by epipolar geometric constraints. In some configurations, association may be performed in accordance with weighted bipartite graph matching using the Hungarian method.

Figure 5:
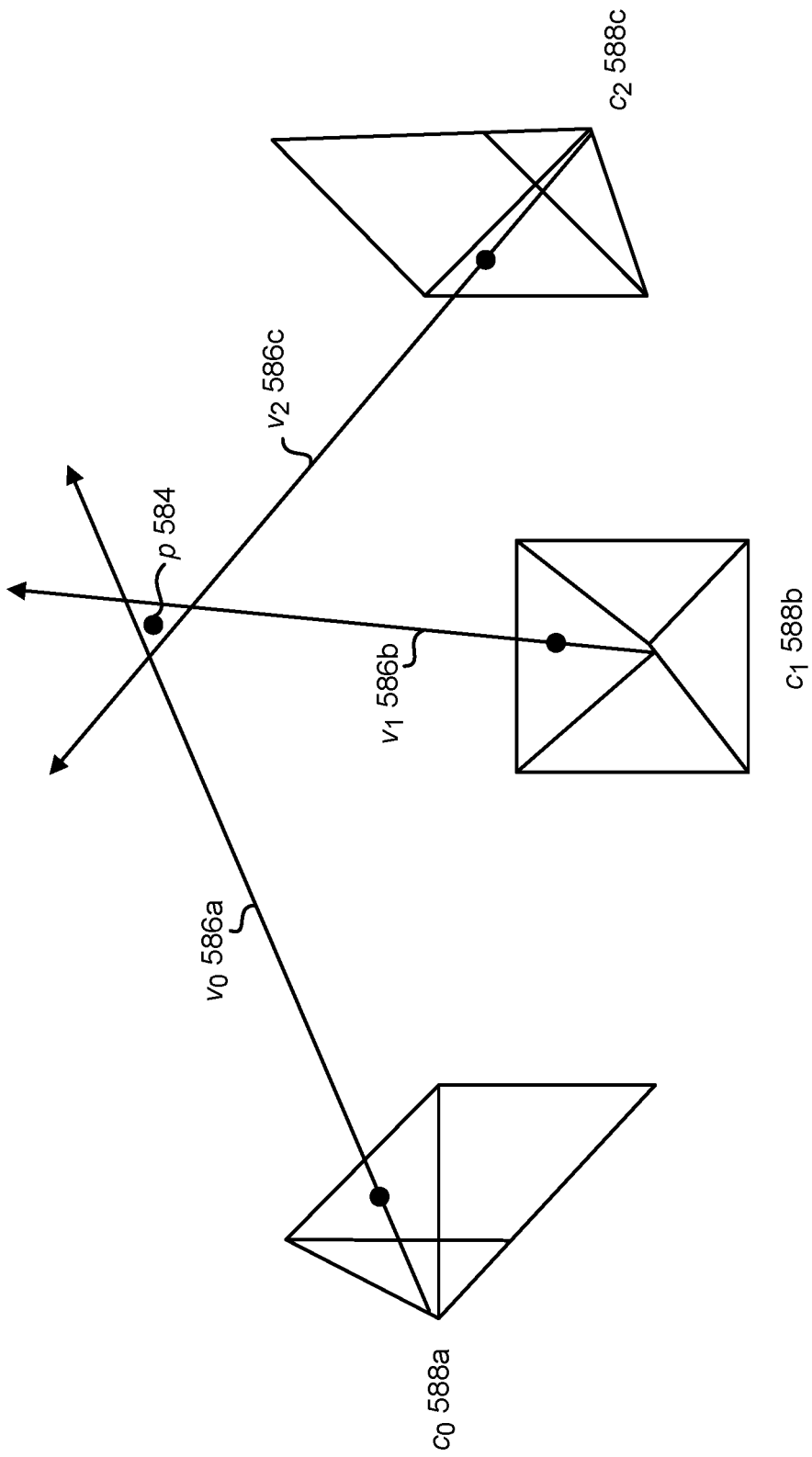
FIG. 5 is a diagram illustrating an example of a mid-point algorithm. The mid-point algorithm may utilize condition number-based pruning.

FIG. 5 is a diagram illustrating an example of a mid-point algorithm. The mid-point algorithm may utilize condition number-based pruning. In particular, FIG. 5 illustrates a point p 584 observed from multiple camera poses $c_{0-2}$ 588a-c. For example, multiple vectors $v_{0-2}$ 586a-c intersect camera planes (e.g., image planes) in observing the point p 584. The point p 584 that best explains the observations may be expressed as $$p = A^{-1}\left[\sum_j (I - v_j v_j^T)c_j\right], A = \sum_j (I - v_j v_j^T),$$

where $c_j$ denotes the center of the camera from where the $j^{th}$ observation was made and $v_j$ denotes the ray starting from $c_j$ and passing through the $j^{th}$ observation. If A has a high condition number (e.g., beyond a condition number threshold), this may imply poor triangulation. Such signs with poor triangulation may be pruned. For example, $\{v_j\}$ may be close to parallel for a sign observed from far away. p (e.g., a sign corner) may serve as initialization for corner optimization. The mid-point algorithm may be applied per sign corner in some configurations of the systems and methods disclosed herein.

Figure 6:
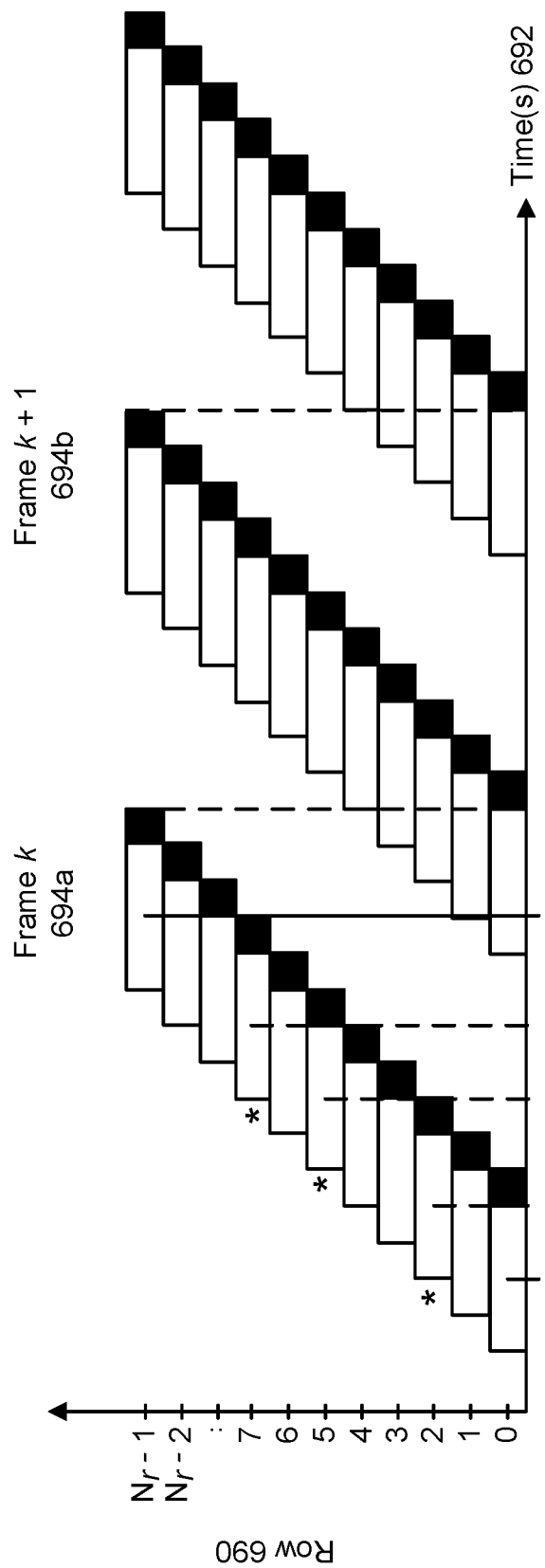
FIG. 6 is a diagram illustrating an example of rolling shutter.

FIG. 6 is a diagram illustrating an example of rolling shutter. In particular, FIG. 6 illustrates pixel row 690 exposure and readout over time 692. One row of pixels is exposed/read out at a time, starting from bottom, where the white part of each bar is exposure time and black is readout time. Therefore, the row at bottom of an object (e.g., sign) may be exposed before the row at the top. The maximum frames per second (fps) and readout time are related, because all rows of one frame have to be read out before a next frame. For example, 30 fps for a camera may imply 33 milliseconds for 800 rows, which may imply a readout time of 40 microseconds (μs). As illustrated in FIG. 6, the readout for a frame (k) 694a occurs before the readout for a subsequent frame (k+1) 694b.

Figure 7:
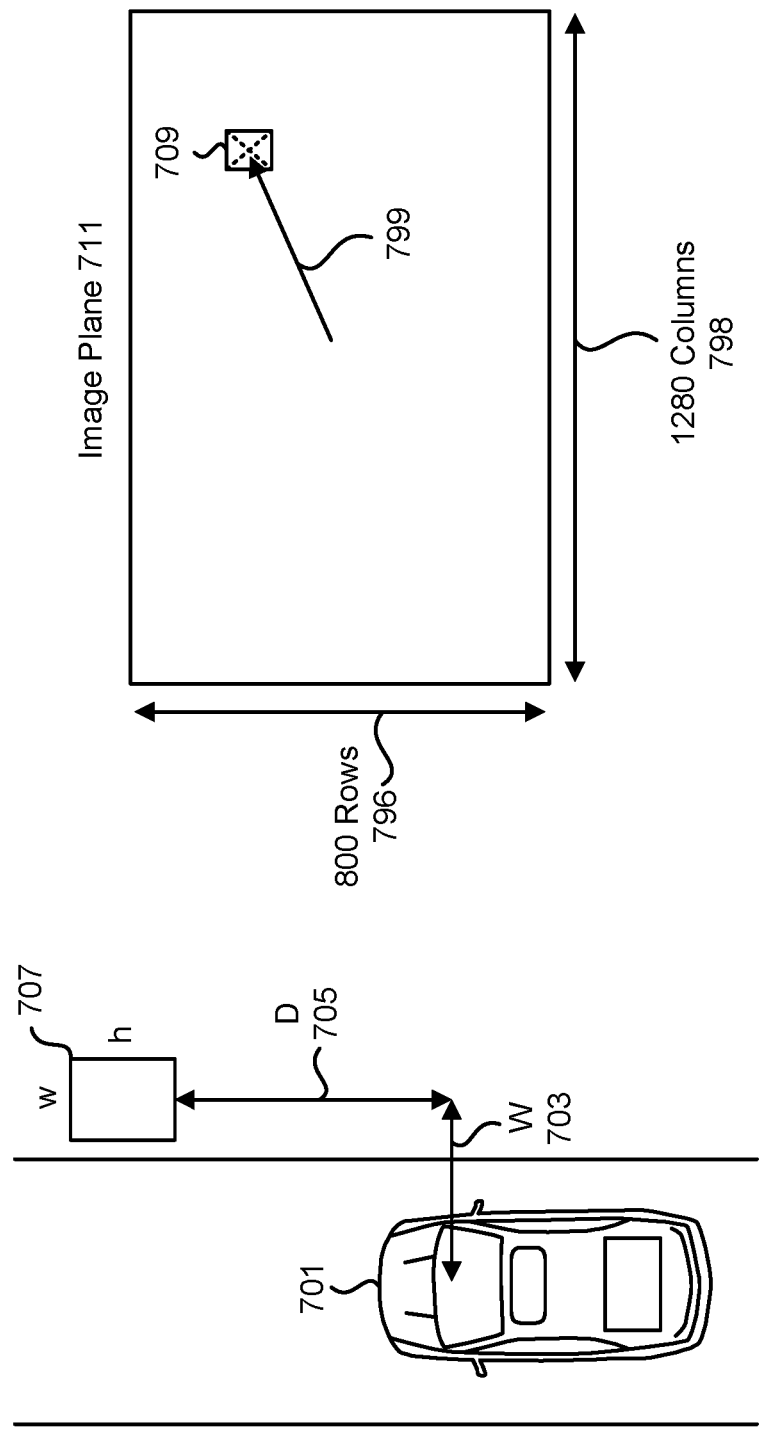
FIG. 7 is a diagram illustrating a scenario for rolling shutter.

FIG. 7 is a diagram illustrating a scenario for rolling shutter. One approach to rolling shutter is to associate a camera pose with each row of an image. Pose may be determined per row by interpolating appropriately between poses of successive frames. Consider the example shown in FIG. 7. The scenario in FIG. 7 illustrates a vehicle 701 along a road with sign 707 posted next to the road. FIG. 7 also illustrates an image plane 711 of a camera in the vehicle 701. The image plane 711 is illustrated in 800 pixel rows 796 over 1280 pixel columns 798. The image plane 711 includes an image 709 of the sign 707. With example values of sign width (w), sign height (h), height of the sign in the camera frame (H), distance to the sign center along a first axis (W), distance to the sign along a second axis (D), and focal length in pixels (f), the relative sign size in the image plane 711 is less than 90 pixels, compared to 800 rows 796 of image size. This may be enough to have a single pose for all corners of a sign, rather than a pose per corner. Pose delta may be compensated for at end points of the arrow 799. Pose change along the four dotted segments may be ignored.

It may be beneficial to utilize an interpolated camera pose (instead of just a single camera pose per frame, for example). For instance, some approaches may utilize a single camera pose associated with a sign, where all signs in a frame had the same associated pose. In some configurations, multiple (e.g., two) camera poses and an interpolation fraction associated with an object (e.g., sign) may be utilized. The additional camera pose may be from a previous or next frame. The interpolation fraction may describe how to combine the two poses. Steps in 3D reconstruction may utilize the interpolation. The mid-point algorithm may include, for each sign corner, un-projecting rays from each observation of the sign, and finding a 3D point closest to all rays. The mid-point algorithm may use interpolated pose. Adjusting sign corners may be done for each corner, keeping the z-coordinate somewhat fixed. Adjusting sign corners may use interpolated pose. Adjusting sign pose and size may be done for each sign. Adjusting sign pose and size may use interpolated pose. Refining (e.g., optimizing) sign pose, size and camera pose (single journey bundle adjustment) may include constraints on relative and reference poses. The cost function may be modified to keep the interpolation fraction fixed while camera poses change.

Table (3) illustrates some simulation results for a single sign in accordance with some configurations of the systems and methods disclosed herein. Table (3) compares pixel shift before rolling shutter compensation and after rolling shutter compensation. In the simulation, sign width (w) is 0.75 meters (m), sign height is 0.9 m, and sign height in the camera frame (H) is 0.9 m. As illustrated in Table (3), rolling shutter compensation may reduce pixel shift of the sign center.

TABLE 3

| | | | | Sign | Pixel shift of sign center (x, y) | |
|---|---|---|---|---|---|---|
| f (pixels) | speed (m/s) | W (m) | D (m) | size (pixels) | Before Compensation | After Compensation |
| 500 | 30 | 4 | 5 | (75, 90) | (8.88, 2.51) | (0.05, 0.52) |
| 500 | 10 | 4 | 5 | (75, 90) | (2.91, 0.82) | (0.01, 0.17) |
| 500 | 30 | 4 | 10 | (37, 45) | (1.09, 0.31) | (0.00, 0.06) |
| 500 | 30 | 12 | 10 | (37, 45) | (3.26, 0.31) | (0.00, 0.06) |
| 500 | 10 | 12 | 10 | (37, 45) | (1.08, 0.10) | (0.00, 0.02) |
| 1400 | 30 | 4 | 15 | (70, 84) | (2.53, 0.71) | (0.00, 0.14) |

Figure 8:
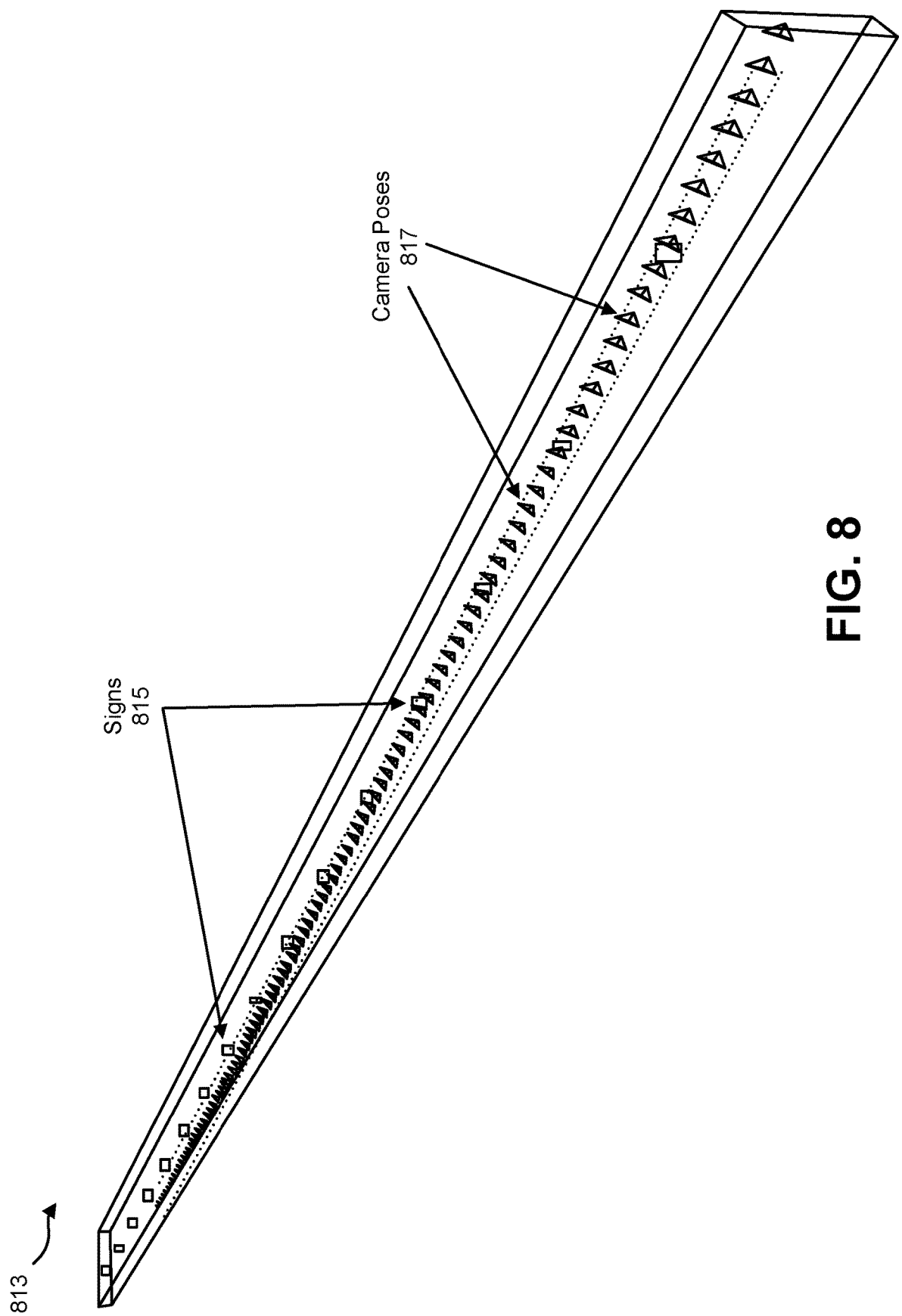
FIG. 8 is a diagram illustrating a simulation setup for testing rolling shutter compensation.

FIG. 8 is a diagram illustrating a simulation setup 813 for testing rolling shutter compensation. In this simulation, 16 signs 815 that go across the lane are placed 20 m apart in various poses. A car speed of 25 meters per second (m/s) (≈56 miles per hour (mph)) was utilized. Frames were captured at 10 fps. The average error in sign center position (in centimeters (cm)) is given in Table (4). Performing interpolation may improve camera pose information. It should be noted that "BA" may be an abbreviation for bundle adjustment.

TABLE 4

| Step | No lens distortion | | | Lens distortion | | |
|---|---|---|---|---|---|---|
| | No Rolling Shutter distortion | Rolling Shutter distortion | Rolling Shutter distortion and compensation | No Rolling Shutter distortion | Rolling Shutter distortion | Rolling Shutter distortion and compensation |
| Midpoint | 0 | 6 | 0 | 0 | 7 | 5 |
| Sign corner optimization | 36 | 38 | 33 | 34 | 36 | 26 |
| Sign pose, size optimization | 4 | 8 | 5 | 4 | 8 | 7 |
| Single journey BA | 4 | 8 | 5 | 4 | 8 | 7 |

More detail of rolling shutter compensation for signs in accordance with some configurations of the systems and methods disclosed herein is given as follows. In particular, a discussion of sign parameters before compensation is given, followed by a discussion of rolling shutter compensation. The rolling shutter compensation described herein may be performed in some configurations of the systems and methods disclosed herein (e.g., by the rolling shutter compensator 122 described in connection with FIG. 1).

A sign center in the camera frame is given at (W, D, H), with sign dimensions of (w, h), and a focal length of f. If a global shutter is utilized, image plane coordinates of corners (in pixels) may be given as follows:

$$\frac{f}{D}\left(W - \frac{w}{2}, H - \frac{h}{2}\right), \frac{f}{D}\left(W + \frac{w}{2}, H - \frac{h}{2}\right),$$
$$\frac{f}{D}\left(W + \frac{w}{2}, H + \frac{h}{2}\right), \frac{f}{D}\left(W - \frac{w}{2}, H + \frac{h}{2}\right).$$

The sign center may be expressed as follows:

$$\frac{f}{D}(W, H).$$

If a rolling shutter (from bottom to top) is utilized, the camera pose associated with the image may be for the middle of the exposure time of the frame (e.g., the pose is for the middle row). If rolling shutter is utilized, image plane coordinates of corners (in pixels) may be expressed as follows:

$$\frac{f}{D - \Delta d_1}\left(W - \frac{w}{2}, H - \frac{h}{2}\right), \frac{f}{D - \Delta d_1}\left(W + \frac{w}{2}, H - \frac{h}{2}\right),$$
$$\frac{f}{D - \Delta d_1 - \Delta d_2}\left(W + \frac{w}{2}, H + \frac{h}{2}\right), \frac{f}{D - \Delta d_1 - \Delta d_2}\left(W - \frac{w}{2}, H + \frac{h}{2}\right).$$

The sign center may be expressed as follows:

$$\frac{1}{2}\left(\frac{f}{D - \Delta d_1} + \frac{f}{D - \Delta d_1 - \Delta d_2}\right)(W, H) +$$
$$\frac{1}{2}\left(\frac{f}{D - \Delta d_1 - \Delta d_2} - \frac{f}{D - \Delta d_1}\right)(0, h),$$

where $\Delta d_1$ and $\Delta d_2$ are the distance moved when bottom and top corners are exposed.

Thus, the pixel shift for center $$\triangleq \left(\frac{f^2 H}{D^3}(W, H) + \frac{f^2 h}{2D^3}(0, h)\right)$$

×speed×readoutTime. As a ratio of image size, pixel shift $$\triangleq \left(\frac{fH}{D^2}\left(\frac{W}{w}, \frac{H}{h}\right) + \frac{fh}{2D^2}(0, 1)\right)$$

×speed×readoutTime. Pixel shift may be linear in speed, quadratic in f, inverse cubed in D, linear/quadratic in W, H and h, and independent of w.

In a first approach, the camera pose associated with the frame is the pose when the center row of the frame is exposed. This pose may be associated with all signs in the frame.

In some configurations of the systems and methods disclosed here, first order compensation may be utilized. Instead of the first approach, each sign may be associated with the camera pose when the center row of the sign is exposed. This pose may be obtained by appropriately interpolating between camera poses of successive frames. Poses may now be associated with signs rather than frames. For example, if t is the timestamp of the camera pose associated with current frame and the center of sign is on row index R, the camera pose at time (t+readoutTime×R) may be obtained (e.g., determined by the rolling shutter compensator 122). This camera pose may be obtained by interpolating between poses at the current frame and next frame. Accordingly, the pixel location for the sign center gets corrected to first order and remaining errors are of second order. Errors for sign corners may still be up to first order, but with opposite signs for top and bottom corners.

Figure 9:
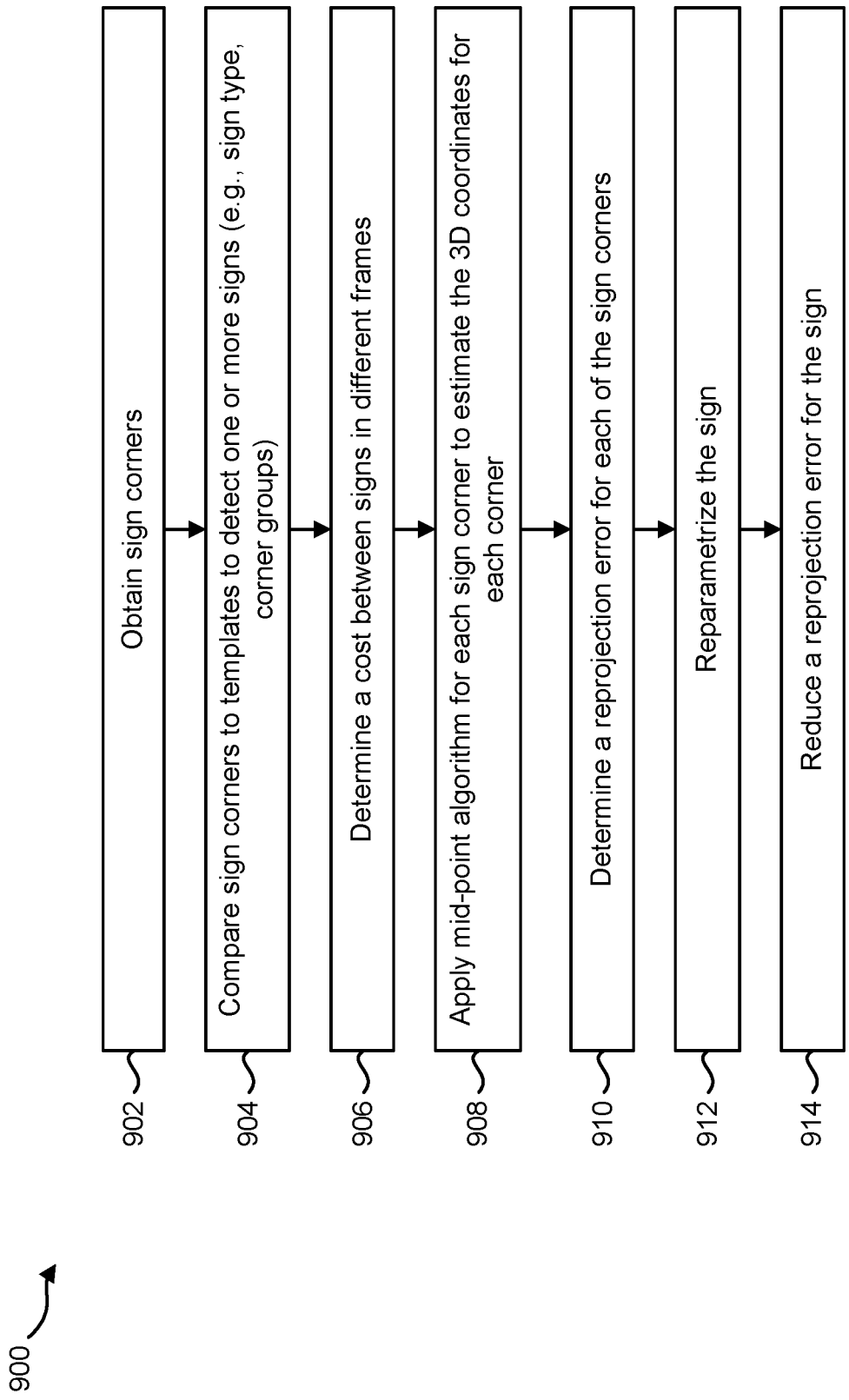
FIG. 9 is a flow diagram illustrating one configuration of a method for sign location.

FIG. 9 is a flow diagram illustrating one configuration of a method 900 for sign location. The method 900 may be performed by the apparatus 102, for example.

The apparatus 102 may obtain 902 sign corners in multiple frames. This may be accomplished as described in connection with FIG. 1. For example, the apparatus 102 may detect sign corners based on image data from the multiple frames. For instance, sign detection may be performed to detect signs in a frame and/or the signs may be registered as templates for sign tracking. Sign tracking may be performed to track the signs in the next frames. For sign detection, a deep neural network may be utilized to predict a homography (matrix M) and sign type (rectangle, diamond, or octagon) that may be used to get sign corners by transforming a sign template into an input scene.

The apparatus 102 may compare 904 sign corners to one or more templates to detect one or more signs. This may be accomplished as described in connection with FIG. 1. For example, the apparatus 102 may correlate the sign corners with one or more sign templates to determine whether the sign corners match a template. A match may indicate a sign detection of a particular sign type (e.g., rectangular, diamond, octagonal, triangular, etc.) and/or may indicate a group of sign corners that corresponds to a single sign.

The apparatus 102 may determine 906 a cost (with an epipolar basis, for example) between signs (e.g., corner pairs) in different frames. This may be accomplished as described in connection with FIG. 1 (e.g., Equation (1)). For example, the cost of associating two sign detections may be the sum of the costs for each pair of points (e.g., corners, vertices, etc.) of signs in different frames. If all costs between sign detections are greater than a threshold, the apparatus 102 may spawn a new track for the sign. Otherwise, the lowest cost between a sign pair may indicate the association.

The apparatus 102 may apply 908 a mid-point algorithm for each sign corner to estimate the 3D coordinates for each corner. This may be accomplished as described in connection with one or more of FIGS. 1 and 5. Each corner p may serve as an initialization for corner adjustment (e.g., optimization).

The apparatus 102 may determine 910 a reprojection error for each of the sign corners. This may be accomplished as described in connection with FIG. 1. The apparatus 102 may adjust the sign corners based on the reprojection error (to minimize the reprojection error, for example).

The apparatus 102 may reparametrize 912 each sign. This may be accomplished as described in connection with FIG. 1. For example, the apparatus 102 may reparametrize 912 each sign to be represented with center, axis, and size. Reparametrizing 912 may include determining a centroid of 3D sign corner coordinates, determining an axis with a best plane fit, and/or estimating sign size.

The apparatus 102 may reduce 914 a reprojection error for the sign. This may be accomplished as described in connection with FIG. 1. For example, the apparatus 102 may adjust the sign pose (e.g., the reparametrized sign) to reduce (e.g., minimize) a reprojection error for the sign.

In some configurations, the apparatus 102 may perform one or more operations based on the 3D pose data. For example, the apparatus 102 may map the 3D pose data, and/or may control one or more vehicles based on the 3D pose data.

Figure 10:
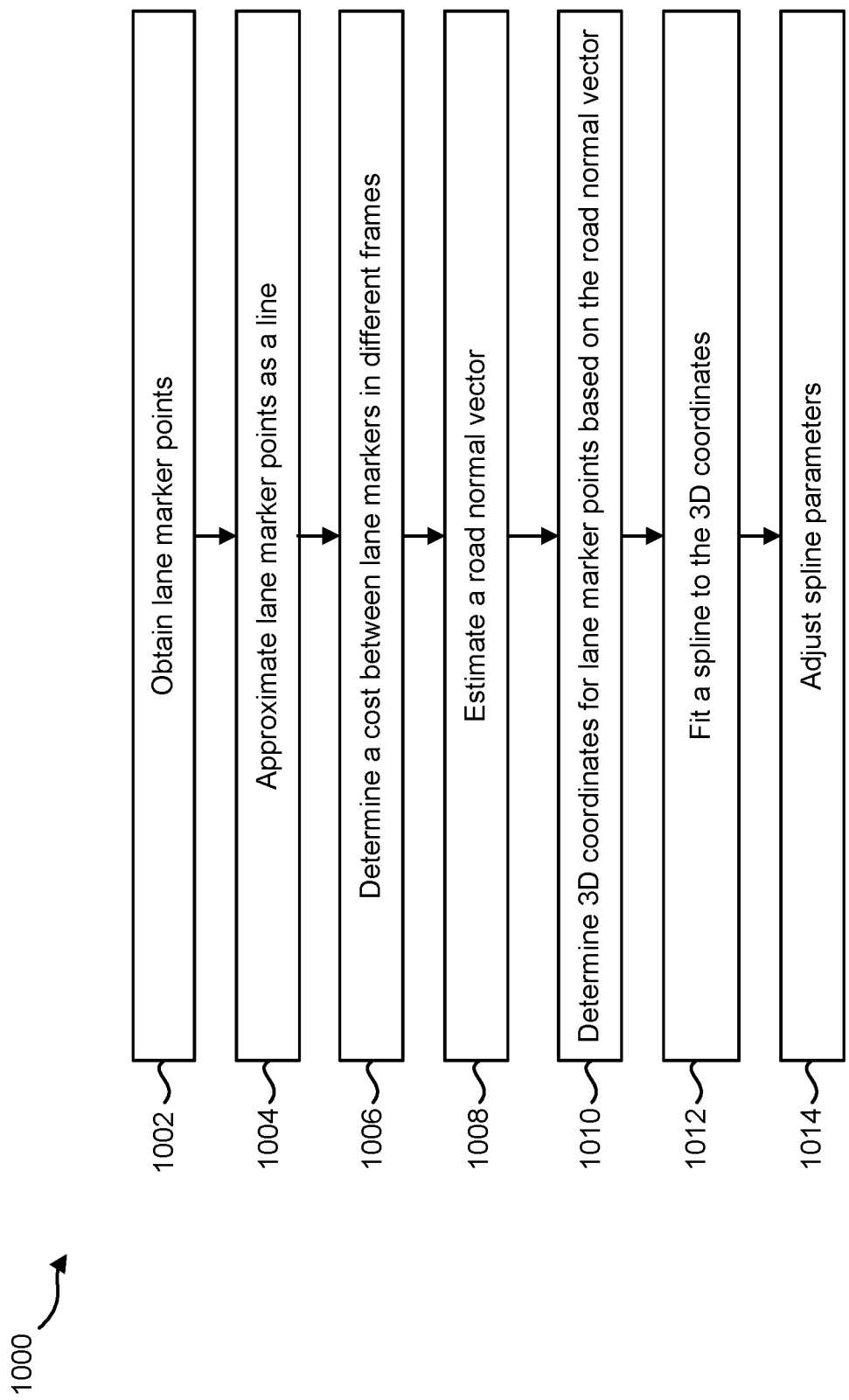
FIG. 10 is a flow diagram illustrating one configuration of a method for lane marker location.

FIG. 10 is a flow diagram illustrating one configuration of a method 1000 for lane marker location. The method 1000 may be performed by the apparatus 102, for example.

The apparatus 102 may obtain 1002 lane marker points in multiple frames. This may be accomplished as described in connection with FIG. 1. For example, the apparatus 102 may detect lane markers based on image data from the multiple frames. The lane marker points may be represented as point clouds in some configurations. For example, lane marker detection may be performed to detect lanes in a frame and spatio-temporal reasoning may be applied to remove false positives, associate lanes in adjacent frames, and speed up. Lane detection may include feature detection with filtering, line segment generation, and lane model estimation.

The apparatus 102 may approximate 1004 the lane marker points as a line. This may be accomplished as described in connection with FIG. 1. For example, the apparatus 102 may determine a line (e.g., linear regression) that represents the point cloud data.

The apparatus 102 may determine 1006 a cost (with an epipolar basis, for example) between lane markers in different frames. This may be accomplished as described in connection with FIG. 1 (e.g., Equation (1)). For example, the cost of associating two lane marker detections may be the sum of pairwise epipolar costs for points sampled from the lines in different frames. If all costs between sign detections are greater than a threshold, the apparatus 102 may spawn a new track for the lane marker. Otherwise, the lowest cost between a lane marker pair may indicate the association.

The apparatus 102 may estimate 1008 a road normal vector. This may be accomplished as described in connection with FIG. 1. For example, the apparatus 102 may update a road normal vector online.

The apparatus 102 may determine 1010 3D coordinates for lane marker points based on the road normal vector. This may be accomplished as described in connection with FIG. 1.

The apparatus 102 may fit 1012 a spline to the 3D coordinates. This may be accomplished as described in connection with FIG. 1. For example, the apparatus 102 may fit a number of control points to a number of 3D coordinates (e.g., 3D lane marker coordinates).

The apparatus 102 may adjust 1014 spline parameters. This may be accomplished as described in connection with FIG. 1.

In some configurations, the apparatus 102 may perform one or more operations based on the 3D pose data. For example, the apparatus 102 may map the 3D pose data, and/or may control one or more vehicles based on the 3D pose data.

Figure 11:
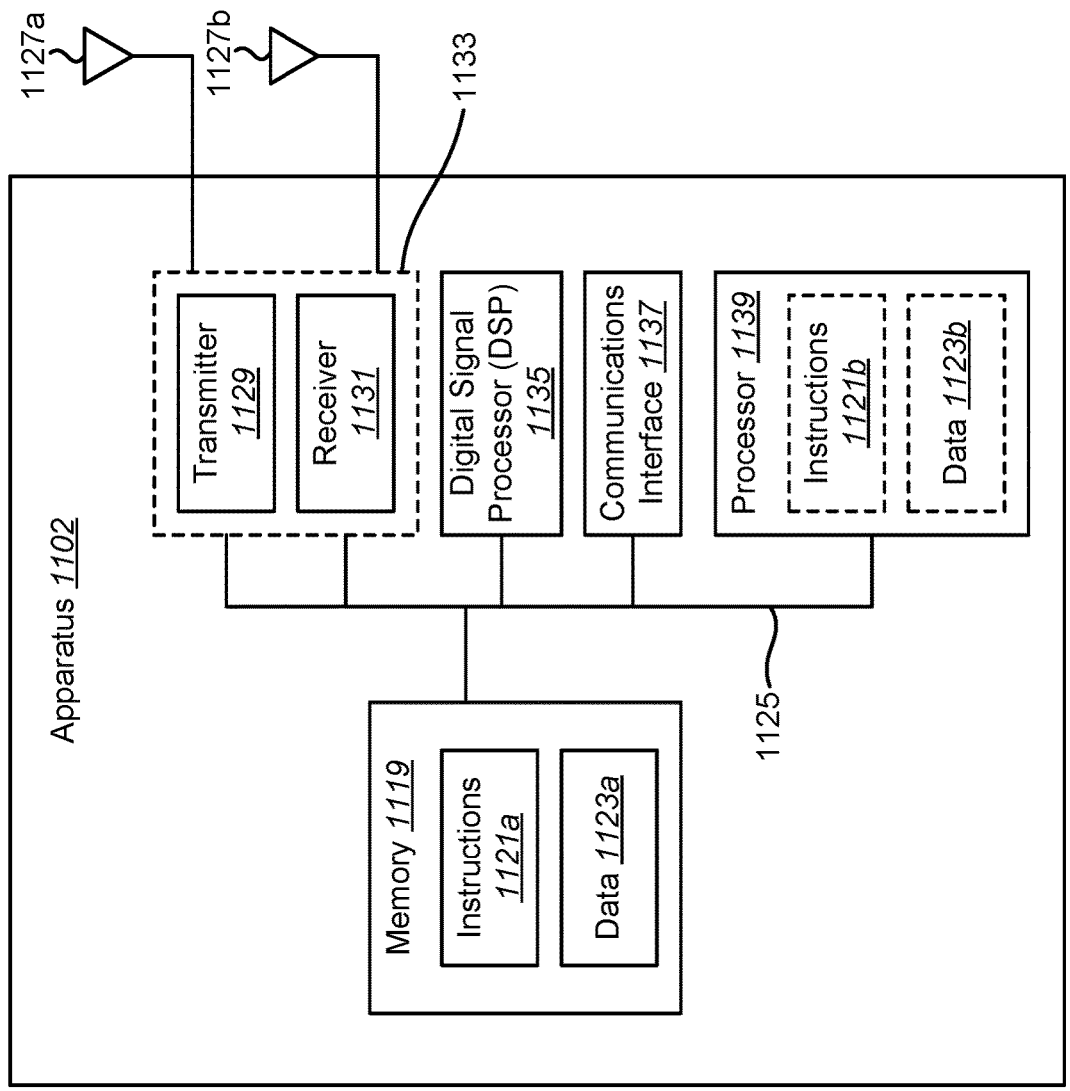
FIG. 11 illustrates certain components that may be included within an apparatus configured to implement various configurations of the systems and methods disclosed herein.

FIG. 11 illustrates certain components that may be included within an apparatus 1102 configured to implement various configurations of the systems and methods disclosed herein. Examples of the apparatus 1102 may include vehicles, cameras, video camcorders, digital cameras, smart phones, computers (e.g., integrated computers, desktop computers, laptop computers, vehicle console computers, etc.), tablet devices, media players, televisions, vehicles, autonomous vehicles, semi-autonomous vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart applications, healthcare equipment, gaming consoles, personal digital assistants (PDAs), set-top boxes, etc. The apparatus 1102 may be implemented in accordance with the apparatus 102 described in connection with FIG. 1.

The apparatus 1102 includes a processor 1139. The processor 1139 may be a general purpose single- or multi-chip microprocessor (e.g., an ARM), a special purpose microprocessor (e.g., a digital signal processor (DSP)), a microcontroller, a programmable gate array, etc. The processor 1139 may be referred to as a central processing unit (CPU). Although just a single processor 1139 is shown in the apparatus 1102, in an alternative configuration, a combination of processors (e.g., an ARM and DSP) could be implemented.

The apparatus 1102 also includes memory 1119. The memory 1119 may be any electronic component capable of storing electronic information. The memory 1119 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1123a and instructions 1121a may be stored in the memory 1119. The instructions 1121a may be executable by the processor 1139 to implement one or more of the methods 200, 900, 1000, procedures, steps, and/or functions described herein. Executing the instructions 1121a may involve the use of the data 1123a that is stored in the memory 1119. When the processor 1139 executes the instructions 1121, various portions of the instructions 1121b may be loaded onto the processor 1139 and/or various pieces of data 1123b may be loaded onto the processor 1139.

The apparatus 1102 may also include a transmitter 1129 and/or a receiver 1131 to allow transmission and reception of signals to and from the apparatus 1102. The transmitter 1129 and receiver 1131 may be collectively referred to as a transceiver 1133. One or more antennas 1127a-b may be electrically coupled to the transceiver 1133. The apparatus 1102 may also include (not shown) multiple transmitters, multiple receivers, multiple transceivers and/or additional antennas.

The apparatus 1102 may include a digital signal processor (DSP) 1135. The apparatus 1102 may also include a communications interface 1137. The communications interface 1137 may allow and/or enable one or more kinds of input and/or output. For example, the communications interface 1137 may include one or more ports and/or communication devices for linking other devices to the apparatus 1102. In some configurations, the communications interface 1137 may include the transmitter 1129, the receiver 1131, or both (e.g., the transceiver 1133). Additionally or alternatively, the communications interface 1137 may include one or more other interfaces (e.g., touchscreen, keypad, keyboard, microphone, camera, etc.). For example, the communication interface 1137 may enable a user to interact with the apparatus 1102.

The various components of the apparatus 1102 may be coupled together by one or more buses, which may include a power bus, a control signal bus, a status signal bus, a data bus, etc. For the sake of clarity, the various buses are illustrated in FIG. 23 as a bus system 1125.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method performed by an apparatus, comprising:
   receiving a set of image frames including at least one object;
   receiving a camera position for each image frame;
   determining whether to associate the at least one object between image frames;
   associating the at least one object between image frames based on one or more object points and the received camera position for each image frame to produce two-dimensional (2D) object location data;
   estimating three-dimensional (3D) pose data of the at least one object based on the 2D object location data; and
   refining the 3D pose data based on a shape constraint.

2. The method of claim 1, further comprising interpolating camera pose variables for one or more points of the at least one object.

3. The method of claim 2, wherein interpolating camera pose variables is based on a pixel location of the at least one object in the set of image frames.

4. The method of claim 2, wherein interpolating camera pose variables is based on a timing of a pixel capture of the at least one object in the set of image frames.

5. The method of claim 2, wherein the interpolation is performed for at least a road sign or a lane marker.

6. The method of claim 2, wherein at least one of said associating the at least one object, said estimating the 3D pose data, or said refining the 3D pose data is based on interpolated camera pose variables.

7. The method of claim 1, wherein refining the 3D pose data comprises:
   reducing a first reprojection error for an individual sign corner;
   reparametrizing 3D sign pose data; and
   reducing a second reprojection error for reparametrized 3D sign pose data.

8. The method of claim 1, wherein refining the 3D pose data comprises reducing a reprojection error for spline parameters.

9. The method of claim 1, wherein estimating the 3D pose data comprises estimating a road normal vector.

10. The method of claim 9, wherein estimating the road normal vector is performed online based on an offline estimated road normal vector.

11. The method of claim 1, further comprising uploading refined 3D pose data to a mapping database.

12. An apparatus, comprising:
    a memory;
    a processor coupled to the memory, wherein the processor is configured to:
    receive a set of image frames including at least one object;
    receive a camera position for each image frame;
    determine whether to associate the at least one object between image frames;
    associate the at least one object between image frames based on one or more object points and the received camera position for each image frame to produce two-dimensional (2D) object location data;
    estimate three-dimensional (3D) pose data of the at least one object based on the 2D object location data; and
    refine the 3D pose data based on a shape constraint.

13. The apparatus of claim 12, wherein the processor is configured to interpolate camera pose variables for one or more points of the at least one object.

14. The apparatus of claim 13, wherein the processor is configured to interpolate the camera pose variables based on a pixel location of the at least one object in the set of image frames.

15. The apparatus of claim 13, wherein the processor is configured to interpolate the camera pose variables based on a timing of a pixel capture of the at least one object in the set of image frames.

16. The apparatus of claim 13, wherein the processor is configured to perform the interpolation for at least a road sign or a lane marker.

17. The apparatus of claim 13, wherein the processor is configured to perform at least one of said associating the at least one object, said estimating the 3D pose data, or said refining the 3D pose data based on interpolated camera pose variables.

18. The apparatus of claim 12, wherein the processor is configured to refine the 3D pose data by:
    reducing a first reprojection error for an individual sign corner;
    reparametrizing 3D sign pose data; and
    reducing a second reprojection error for reparametrized 3D sign pose data.

19. The apparatus of claim 12, wherein the processor is configured to refine the 3D pose data by reducing a reprojection error for spline parameters.

20. The apparatus of claim 12, wherein the processor is configured to estimate the 3D pose data by estimating a road normal vector.

21. The apparatus of claim 20, wherein the processor is configured to estimate the road normal vector online based on an offline estimated road normal vector.

22. The apparatus of claim 12, wherein the processor is configured to upload refined 3D pose data to a mapping database.

23. A non-transitory tangible computer-readable medium storing computer executable code, comprising:
    code for causing an electronic device to receive a set of image frames including at least one object;
    code for causing the electronic device to receive a camera position for each image frame;
    code for causing the electronic device to determine whether to associate the at least one object between image frames;
    code for causing the electronic device to associate the at least one object between image frames based on one or more object points and the received camera position for each image frame to produce two-dimensional (2D) object location data;
    code for causing the electronic device to estimate three-dimensional (3D) pose data of the at least one object based on the 2D object location data; and
    code for causing the electronic device to refine the 3D pose data based on a shape constraint.

24. The computer-readable medium of claim 23, further comprising code for causing the electronic device to interpolate camera pose variables for one or more points of the at least one object.

25. The computer-readable medium of claim 23, wherein the code for causing the electronic device to refine the 3D pose data comprises:
 code for causing the electronic device to reduce a first reprojection error for an individual sign corner;
 code for causing the electronic device to reparametrize 3D sign pose data; and
 code for causing the electronic device to reduce a second reprojection error for reparametrized 3D sign pose data.

26. The computer-readable medium of claim 23, wherein the code for causing the electronic device to refine the 3D pose data comprises code for causing the electronic device to reduce a reprojection error for spline parameters.

27. An apparatus, comprising:
 means for receiving a set of image frames including at least one object;
 means for receiving a camera position for each image frame;
 means for determining whether to associate the at least one object between image frames;
 means for associating the at least one object between image frames based on one or more object points and the received camera position for each image frame to produce two-dimensional (2D) object location data;
 means for estimating three-dimensional (3D) pose data of the at least one object based on the 2D object location data; and
 means for refining the 3D pose data based on a shape constraint.

28. The apparatus of claim 27, further comprising means for interpolating camera pose variables for one or more points of the at least one object.

29. The apparatus of claim 27, wherein the means for refining the 3D pose data comprises:
 means for reducing a first reprojection error for an individual sign corner;
 means for reparametrizing 3D sign pose data; and
 means for reducing a second reprojection error for reparametrized 3D sign pose data.

30. The apparatus of claim 27, wherein the means for refining the 3D pose data comprises means for reducing a reprojection error for spline parameters.

* * * * *